United States Patent

Sorrells et al.

Patent Number: 5,996,726
Date of Patent: Dec. 7, 1999

[54] SYSTEM AND METHOD FOR DETERMINING THE DISTRIBUTION AND ORIENTATION OF NATURAL FRACTURES

[75] Inventors: Gordon Sorrells, Garland, Tex.; Norman R. Warpinski, Albuquerque, N.Mex.

[73] Assignee: Gas Research Institute, Chicago, Ill.

[21] Appl. No.: 09/015,457

[22] Filed: Jan. 29, 1998

[51] Int. Cl.[6] .................................................. G01V 1/00
[52] U.S. Cl. ............................... 181/106; 367/86; 175/40
[58] Field of Search ................................. 181/106, 105, 181/116, 401, 402; 367/86; 175/1, 2, 40; 166/305.1

[56] References Cited

U.S. PATENT DOCUMENTS

| | | |
|---|---|---|
| 2,276,335 | 3/1942 | Peterson . |
| 2,281,751 | 5/1942 | Cloud . |
| 2,788,510 | 4/1957 | Howes ..................................... 181/106 |
| 3,193,004 | 7/1965 | Albright et al. . |
| 3,739,871 | 6/1973 | Bailey . |
| 3,876,971 | 4/1975 | Wuenschel ............................... 181/106 |
| 4,009,609 | 3/1977 | Sayer et al. . |
| 4,057,780 | 11/1977 | Shuck ....................................... 367/86 |
| 4,085,798 | 4/1978 | Schweitzer et al. . |
| 4,214,226 | 7/1980 | Narisimhan et al. . |
| 4,280,200 | 7/1981 | Silverman . |
| 4,383,591 | 5/1983 | Ogura . |
| 4,396,088 | 8/1983 | Bayhi . |
| 4,399,359 | 8/1983 | Fertl et al. . |
| 4,815,557 | 3/1989 | Duwe . |
| 4,993,001 | 2/1991 | Winbow et al. . |
| 5,377,104 | 12/1994 | Sorrells et al. .......................... 364/421 |
| 5,461,594 | 10/1995 | Mougenot et al. . |
| 5,537,364 | 7/1996 | Howlett . |

OTHER PUBLICATIONS

Julian, Bruce R. and G.R. Foulger, "Earthquake Mechanisms from Linear-Programming Inversions of Seismic-Wave Amplitude Ratios," *Bulletin of the Seismological Society of America*, vol. 86, No. 4 pp. 972–980, Aug. 1996.

*Primary Examiner*—Khanh Dang
*Attorney, Agent, or Firm*—Pauley Petersen Kinne & Fejer

[57] ABSTRACT

In oil and gas production, a process known as hydraulic fracturing is often used. Hydraulic fracturing involves pumping a fluid under pressure down a well bore into a fluid reservoir. When the pressurized fluid enters the reservoir, it produces localized failures of rock within the earth known as fractures. These fractures generate elastic waves known as microseisms that travel outward from the source of the fractures in a spherical wavefront. These microseisms can be measured with sensors located near the well bore, and their source determined. The microseismic wavefront is composed of compressional and shear waves. The amplitudes of the compressional and shear waves can be detected and measured and the ratio of the shear wave amplitude to the compressional wave amplitude which is known as the S/P ratio, can be determined. The orientation of the natural fractures in the earth are determined by comparing the S/P ratio of the waves generated by hydraulic fracturing with predicted S/P ratios for theoretical failure mechanisms and orientations. The predicted S/P ratios are calculated for theoretical failure mechanisms and orientations on the basis of the measured wave source. Forward modeling techniques are used to match the actual and predicted S/P ratios to determine the failure mechanism and the orientation of the natural fracture which generated the microseisms during the hydraulic fracturing.

20 Claims, 19 Drawing Sheets

| TEST | $\varphi_n$ FRACTURE NORMAL: BEARING ANGLE (DEGREES) | | | $\theta_n$ FRACTURE NORMAL: DIP ANGLE (DEGREES) | | | D DILATANCY RATIO | MODEL PARAMETERS | | |
|---|---|---|---|---|---|---|---|---|---|---|
| | ACTUAL | MEDIAN | DISPERSION | ACTUAL | MEDIAN | DISPERSION | MEAN RESIDUAL | RANGE (FEET) | STRESS REGIME | MODEL ERRORS |
| 1 | 70 | 70.8 | 16.5 | 55.0 | 55.0 | 0.6 | -0.006 | 400 | e | NONE |
| 2 | 70 | 75.6 | 17.9 | 55.0 | 57.1 | 2.9 | -0.009 | 400 | e | MEASUREMENT |
| 3 | 70 | 77.6 | 21.8 | 55.0 | 57.1 | 4.2 | +0.012 | 400 | e | MEASUREMENT AND LOCATION |
| 4 | 70 | 76.0 | 22.1 | 89.0 | 91.5 | 7.4 | +0.006 | 400 | e | MEASUREMENT AND LOCATION |
| 5 | 70 | 76.8 | 23.3 | 34.0 | 36.2 | 8.5 | +0.003 | 400 | e | MEASUREMENT AND LOCATION |
| 6 | 36 | 50.4 | 42.3 | 55.0 | 57.1 | 4.4 | +0.046 | 400 | e | MEASUREMENT AND LOCATION |
| 7 | 120 | 102 | 30.5 | 55.0 | 57.1 | 4.3 | -0.038 | 400 | e | MEASUREMENT AND LOCATION |
| 8 | 100 | 94.4 | 17.9 | 55.0 | 57.1 | 5.3 | -0.013 | 400 | e | MEASUREMENT AND LOCATION |
| 9 | 100 | 89 | 16.5 | 55.0 | 59.0 | 14.8 | +0.068 | 800 | e | MEASUREMENT AND LOCATION |
| 10 | 85.0 | 80.0 | 24.0 | 55.0 | 64.0 | 27.0 | +0.053 | 1600 | e | MEASUREMENT AND LOCATION |
| 11 | 100 | 96.8 | 26.6 | 55.0 | 57.1 | 7.4 | -0.017 | 200 | e | MEASUREMENT AND LOCATION |
| 12 | 10 | 15 | 32.2 | 90.0 | 90.7 | 6.5 | +0.082 | 400 | c | MEASUREMENT AND LOCATION |
| 13 | 130 | 106 | 33.0 | 90.0 | 89.3 | 12.7 | +0.202 | 400 | c | MEASUREMENT AND LOCATION |

NOTE: e=EXTENSIONAL.
c=COMPRESSIONAL.

FIG.8D

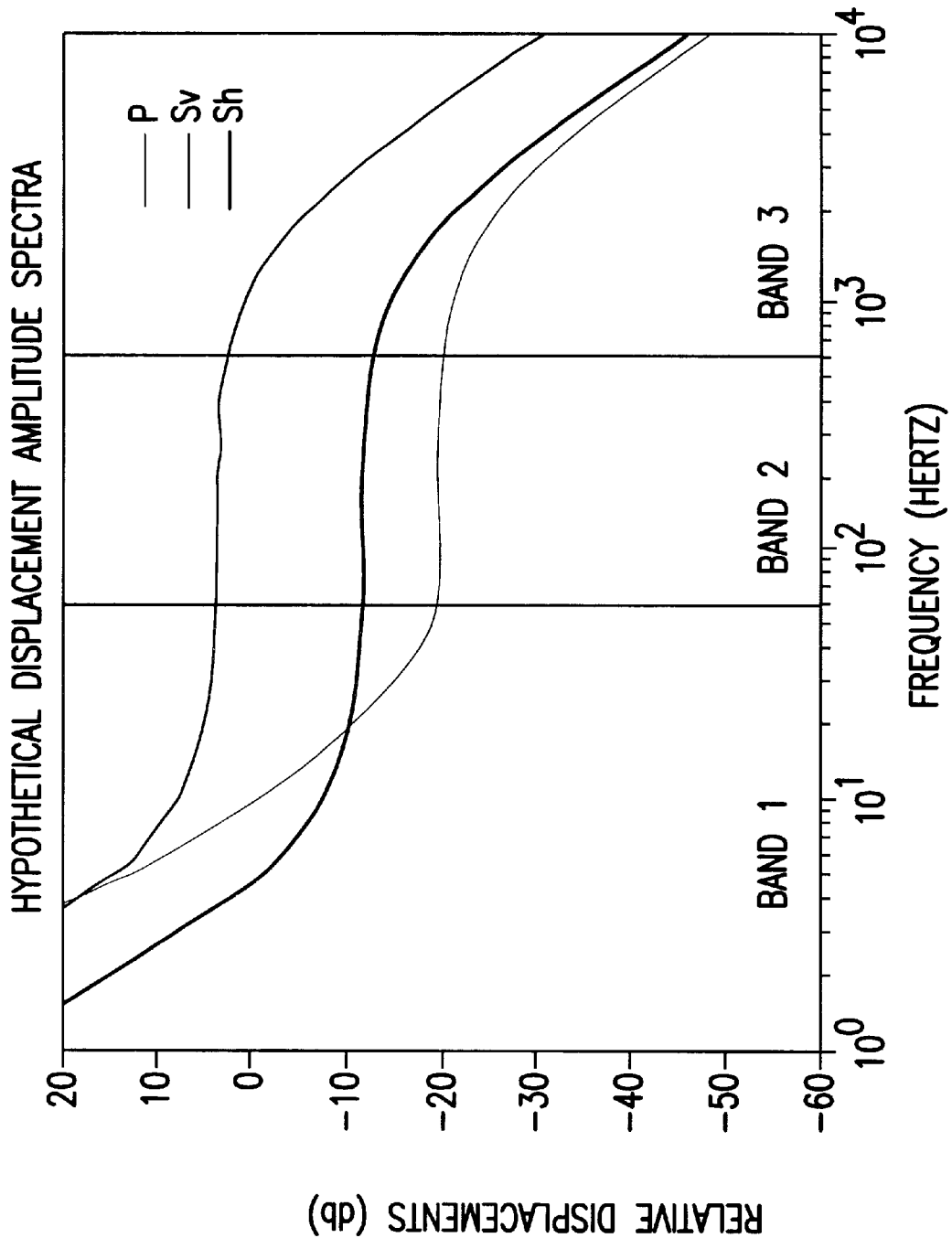

SYSTEM AND METHOD FOR DETERMINING THE DISTRIBUTION AND ORIENTATION OF NATURAL FRACTURES

BACKGROUND OF THE INVENTION

1. Field of the Invention

The present invention generally relates to the field of oil and gas production and, more particularly, to a system and method for the in situ determination of the distribution and orientation of natural fractures in subterranean formations.

2. Discussion of the Related Art

Planar flaws such as faults, fractures, joints, etc., exist in abundance in all subterranean rock formations. With the exception of certain sets found in so-called "naturally fractured" formations, most of these flaws remain closed under the conditions imposed by the in situ stress state. However, perturbations of this state, such as those caused by fluid injection, will result in renewed movement on those flaw sets which are favorably oriented with respect to the principal axes of the perturbed stress state. Theoretical studies predict that these movements will be characterized by both a deviatoric component (relative movement parallel to the fracture face) as well as a dilatant component (relative movement perpendicular to the fracture face) depending upon the orientation of the fracture with respect to the principal axes of the local stress state as well as upon the relative magnitude of these stresses. Dilatant movement on a given fracture will enhance its fluid conductivity relative to that of the surrounding matrix. Consequently, fluid flow will proceed in directions defined by the orientation and distribution of those fracture sets which are not only activated by the injection process but are also characterized by a significant dilatational component of relative movement. Therefore, in order to maximize the efficiency of fluid injection projects such as waterfloods and to aid in the resolution of fluid leak-off problems associated with hydraulic fracturing treatments, it is important not only to determine the orientation of the fractures activated by the injection process, but also to determine their capacity for dilatant movement under the conditions imposed by the existing stress state.

At the present time, data concerning the distribution and orientation of natural fractures is typically acquired from the analysis of oriented core data. This method has the following disadvantages:

It samples only a small fraction of the reservoir.

It undersamples the density of fractures whose dips are approximately normal to the axis of the core.

It undersamples the density of fractures whose dimensions are much larger than the core dimensions.

In order to compensate for these problems, data provided by cross-well seismic surveys has occasionally been used to supplement the core data. However, cross-well seismics will only detect fractures whose dimensions are greater than a few meters and then only if there is a significant contrast in elastic properties of the rock matrix across the fracture face. Geologic studies of reservoir outcrops have also been used to address this problem. However, there may be no accessible outcrops of the reservoir rock. Even if such outcrops exist, there is no guarantee that the fracture distribution observed at the surface is representative of the distribution in the production zone. Neither of these techniques listed above will identify those fracture sets which are likely to be activated by the injection process and they provide no information concerning the dilatant properties of the observed fracture sets.

Attempts have also been made to put seismic sensors in reservoirs for relatively long periods of time, to detect the induced microseismic activity and map the spatial continuity of the sources of such activity using standard microseismic analysis techniques. While this method will identify the fractures activated by the injection process, it provides no information about the orientation and dilatant behavior of the fractures and is time consuming and costly to implement. Thus, there is a need for a method which will not only identify fracture sets activated by fluid injection, but also discriminate between deviatoric and dilatant fracture trends in a timely and cost effective manner.

It is well known that the amplitudes of seismic waves are functionally dependent, not only upon the strength of the source, and the length of the ray-path between source and observation point, but also upon the orientation of the source fracture, the orientation of its slip direction, and the orientation of the ray path at its point of origin. Thus, augmentation of standard microseismic data processing procedures to include the processing and analysis of the P and S wave amplitude data will provide estimates of the orientation of the source fractures and their slip directions. While the combined output of both the standard microseismic analysis and fracture orientation processing procedures will discriminate between deviatoric and dilatant fracture trends activated by the injection process.

Standard microseismic analysis techniques locate the sources of the microseismic activity induced by fluid injection. There are two basic methods for the accomplishment of this task. If several sensors at widely distributed locations are available, then generalized triangulation techniques should be used to determine microseismic source locations. Generalized triangulation, requires the measurement of the initial arrival times of the elastic waves generated by the source at the distributed observation points, as well as an independently acquired model of the seismic wave velocity distributions between the source and the observations points. Generalized triangulation can provide highly accurate source locations under ideal circumstances. However, for most typical oil and gas applications, such as hydraulic fracturing, ideal circumstances are rarely attainable. The essential problem is that the strengths of the induced microseismic sources are relatively weak and their associated elastic waves are not usually detectable at ranges in excess of 1000–2000 feet. Since most oil and gas production is derived from formations at depths greater than 1000–2000 feet, it is generally not feasible to attempt to detect induced microseismic activity with sensors deployed on the earth's surface. Thus, microseismic sensor systems deployed to monitor oil and gas well stimulation or production processes must typically be placed in nearby offset wells or in the injection well itself. When only one observation well is available, distribution of the sensors is restricted and the generalized triangulation technique becomes ineffective.

Since the cost of furnishing more than one well for microseismic observations is usually prohibitive to the producer, a second method of microseismic source location has evolved for oil and gas well monitoring applications. This method is implemented by measuring the arrival times of the compressional waves (P waves) and shear waves (S waves) as well as the particle motion of the P wave with orthogonally oriented, three component sensors deployed at one or more points in the observation well. Then, assuming that the elastic wave velocity distributions in the rock formations are known, the distances between the sources and the observation points may be determined from the differences between the arrival times of the P and S waves;

while the directions from the observation points to the sources may be inferred from the orientation of the P wave particle motion. Fairly precise source locations can be obtained through the application of this method when data are available from 4 or more observation points and the distance between source and observation points is less than 1000–2000 feet.

The system and method of the present invention was developed specifically to augment this latter standard microseismic analysis technique so that it is particularly well suited for applications to microseismic data acquired in a single observation well. The present invention measures, then determines the ratio of the amplitudes of the shear and compressional waves detected at multiple points in one or more observation wells for each source fracture. It then uses a forward modeling method which compares these ratios to theoretical values to determine the orientation of a vector normal to the source fracture plane and a vector parallel to the direction of relative movement of the two surfaces of the source fracture plane. The dilatant behavior of the source fracture, if any, is then determined by comparison of the orientation of these two vectors.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system for determining the distribution and orientation of natural fractures in the earth. In accordance with one aspect of the invention, a system comprises an injection well having a fluid reservoir beneath the earth's surface. A pressure source for pressurizing the fluid within the reservoir is also provided. In this way, pressurized fluid within the reservoir causes movement along natural fractures, which movement creates microseismic activity in the form of shear waves and compressional waves radiated from the fracture. This system further includes an observation well remotely disposed from the injection well, preferably within a distance of several thousand feet. Sensing means and evaluating means are disposed at the observation well for sensing seismic waves that emanate from the natural fracture, and for determining various wave characteristics.

In accordance with a preferred embodiment, the sensing means includes a plurality of sensors that are disposed in a vertical array in a single observation well. This represents a significant improvement over systems of the prior art, wherein sensors were disposed in multiple observation wells in order to obtain the necessary signals for computations. The preferred system further includes a data recorder and a signal processor that receive electrical signals generated by the plurality of sensors. The signal processor includes coded segments which perform various functions, including: analyzing sensed wave data to estimate coordinates of the sensed wave source, the sensed wave source being a natural fracture in the earth; determining an amplitude of a shear wave component produced by the natural fracture, determining an amplitude of a compressional wave component produced by the natural fracture; predicting a theoretical shear wave versus compressional wave amplitude ratio for point sources of arbitrary failure, and matching a determined and a predicted shear wave versus compressional wave amplitude ratio to determine a failure mechanism and an orientation of the natural fracture.

In accordance with another aspect of the invention, a method is provided for accurately determining the distribution and orientation of natural fractures in the earth by analyzing microseismic activity along said natural fractures induced by external stimuli. Preferably, the method includes the steps of: detecting the elastic waves generated by said microseismic activity and determining the source coordinates of said waves. The method further determines the amplitudes of the shear wave (S-wave) component and the compressional wave (P-wave) component of said waves and determines the ratio of said S-wave amplitude to said P-wave amplitude (S/P ratio). Then, using the source coordinates, the method predicts S/P ratios for point sources. Finally, the method matches the determined S/P ratio and the predicted S/P ratio to determine the failure mechanism and orientation of the natural fracture.

In this foregoing manner, the system and method of the present invention allows the distribution and orientation of natural fractures in the earth to be determined from microseismic data. The present invention compares the ratio of the amplitude of the shear waves and compressional waves detected during microseismic activity (the S/P ratio) with S/P ratios for theoretical failure mechanisms and orientations that are predicted based on the coordinates of the source of such microseismic activity. The actual and predicted S/P) ratios are matched using forward modeling techniques to determine the failure mechanism and orientation of the natural fractures that generated the microseismic activity.

DESCRIPTION OF THE DRAWINGS

The accompanying drawings incorporated in and forming a part of the specification, illustrate several aspects of the present invention, and together with the description serve to explain the principles of the invention. In the drawings:

FIG. 8D is a data table;

FIG. 9 displays hypothetical P, Sv, and Sh spectra;

DETAILED DESCRIPTION OF THE PREFERRED EMBODIMENT

Figure 1:
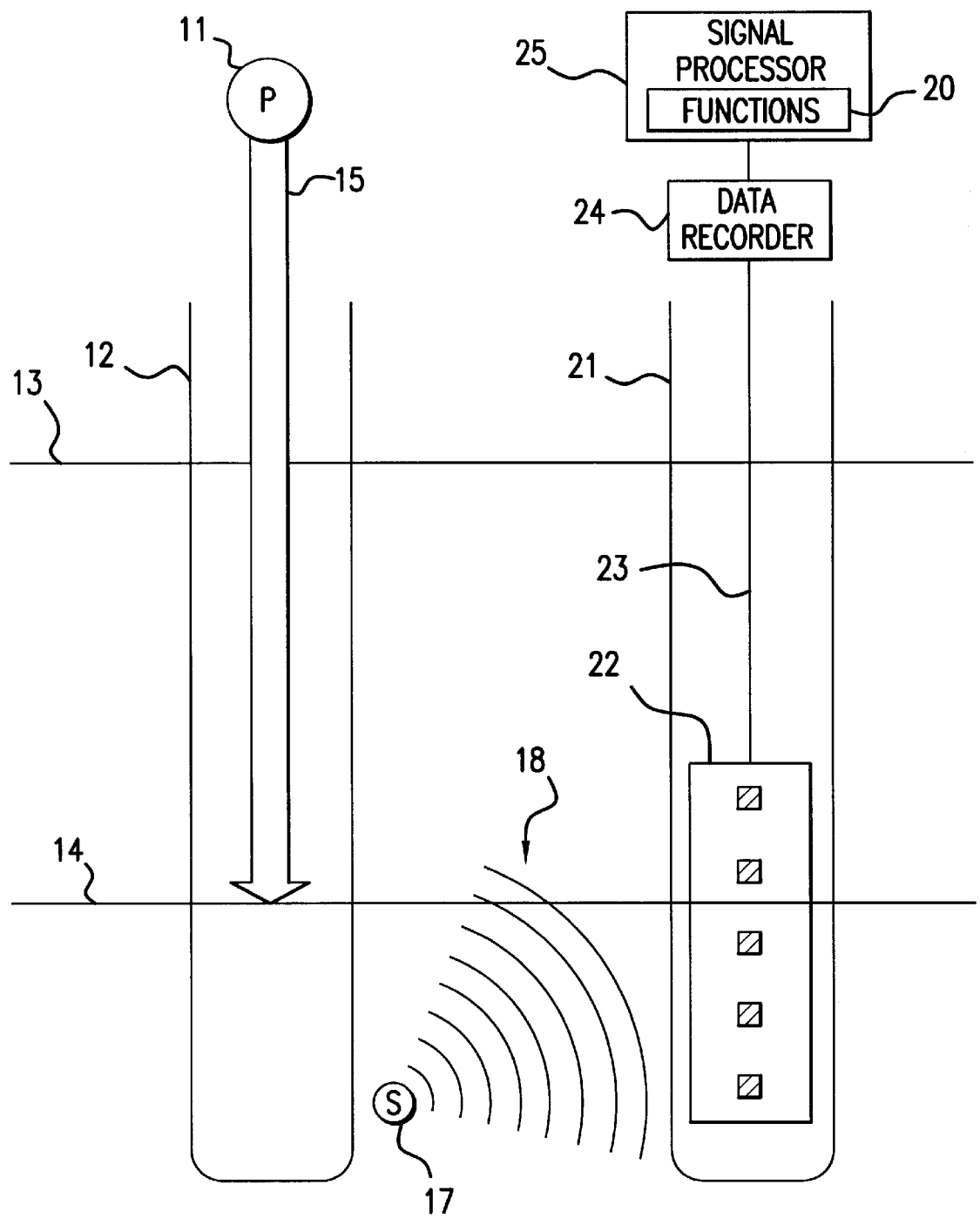
FIG. 1 is a schematic representation of a system and method for determining the distribution and orientation of natural fractures in subterranean structures in accordance with the present invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

With reference now to the drawings, FIG. 1 illustrates a schematic diagram of a first embodiment of a system and method for determining the distribution and orientation of natural fractures in accordance with the present invention. A source 11 containing pressurized fluid is connected to the bore hole of an injection well 12. As illustrated, the injection well extends below the earth's surface, where the earth's surface is denoted by reference numeral 13. Beneath the earth's surface 13, the bore hole extends into a fluid reservoir, the surface of which is denoted as 14. In a manner that is known, fluid within the reservoir may be pressurized by the source 11 to expand and apply pressure to the surrounding earthen walls. This applied pressure causes movement along natural fractures which movement results in seismic activity.

More specifically as the movement occurs along the fractures seismic waves radiate outwardly therefrom. As is known in the prior art, these waves may be detected by sensors disposed in multiple observations wells and used by employing triangulation or other computation techniques to detect the origin and other information about the natural fracture.

In accordance with the preferred embodiment of the present invention, a single observation well 21 is used to obtain the same information. Advantageously, this eliminates the need for having multiple observation wells, and therefore lowers the overall system implementation cost. Preferably the observation well 21 is located within approximately several thousand feet of the injection well.

Rather than disposing multiple sensors in multiple observation wells, the preferred embodiment disposes multiple sensors 22 in a single observation well. Specifically, the preferred embodiment disposes a plurality of sensors 22 in a vertical array within the observation well 21. In operation, pressurized fluid 15 from the fluid source 11 is pumped into the bore hole of the injection well 12. As the pressurized fluid enters the fluid reservoir 14, the fluid causes movements along the surfaces of the natural fractures (not shown) in the surrounding formations. Such movements along the fracture surfaces generate elastic waves that travel outwardly from their source 17 in a spherical wavefront 18. These waves are detected by a multi-level monitoring system 22 located in the bore hole of the observation well 21. The monitoring system is connected by wiring or by telemetry 23 to a data recording device 24 and a signal processor 25. The signal processor functions are denoted as 20.

Figure 2:
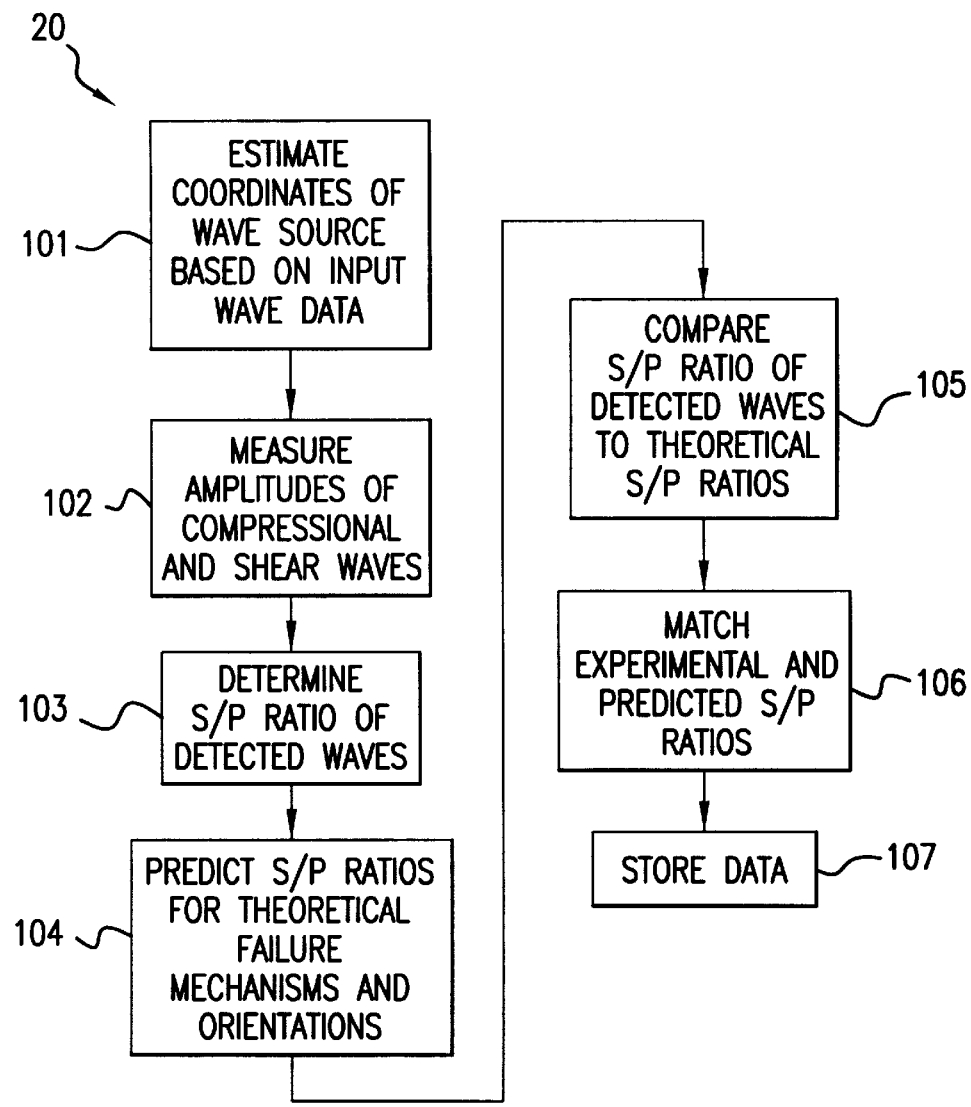
FIG. 2 is a simplified flow chart of the functions of the signal processor depicted in FIG. 1.

FIG. 2 is a simplified flow chart of the functions 20 of the signal processor 25. In step 101, the signal processor analyzes the input wave data to estimate coordinates of the wave source 17. Next, in step 102, the signal processor 25 measures the total amplitudes of the far-field, point source component of the detected compressional and associated shear waves. Using these wave amplitudes, in step 103, the signal processor 25 determines the ratio of the shear wave amplitude to the compressional wave amplitude (S/P ratio) using known methods.

Next, in step 104, the signal processor 25 uses the source location coordinates to predict S/P ratios for theoretical failure mechanisms and orientations. Next, in step 105, the signal processor 25 compares the S/P ratio of the detected waves to the theoretical S/P ratios. Then, in step 106, the signal processor 25 uses forward modeling techniques to match the experimental and predicted S/P amplitude ratios to determine the failure mechanism and the orientation of the natural fracture which generated the waves. Finally, in step 107, the signal processor 25 stores the source location, orientation, and failure mechanism data for any future analysis and interpretation that may be desired.

MATHEMATICAL EXPRESSIONS FOR S/P AMPLITUDE RATIOS

To provide a better understanding of the present invention, the following will present some mathematical models and simulations for a system constructed in accordance with the present invention, Letting $\alpha$ and $\beta$ represent the P wave and S wave speeds in a homogeneous, isotropic, elastic solid, suppose that relative movement occurs across a fracture plane surface of area, $\delta A$, which is presumed to be small compared to the wavelengths of the seismic waves of interest and which is located with respect to an arbitrarily selected observation point by the vector, $\vec{v}$. Let $\hat{n}$ be the unit vector normal to the surface and let the vector, $\vec{s}$, specify the magnitude and direction of the relative movement of the two fracture faces which is presumed to be constant over the surface area, $\delta A$. Let $F(\omega)$ be the spectrum of the time history of the relative movement of the two fracture surfaces, where $\omega$ is the angular frequency. Now assume that $$\frac{\beta}{\omega r} < \frac{\alpha}{\omega r} \ll 1 \qquad (1)$$

Given this assumption, it can be shown that if $\vec{U}^{FP}(\omega,r)$ and $\vec{U}^{FS}(\omega,r)$ are respectively, the far field displacement spectra of the P and S waves generated by the relative movement, $\vec{s}$, then $$\vec{U}^{FP}(\omega, r) = \qquad (2)$$
$$\frac{i\omega s A}{4\pi\alpha r}\left[\left(1 - 2\frac{\beta^2}{\alpha^2}\right)(\hat{n}\circ\hat{s}) + 2\frac{\beta^2}{\alpha^2}(\hat{r}\circ\hat{n})(\hat{r}\circ\hat{s})\right]\exp\left(\frac{i\omega r}{\alpha}\right)F(\omega)\hat{r}$$

and $$\vec{U}^{FS}(\omega, r) = -\frac{i\omega s A}{4\pi\beta r}[2(\hat{r}\circ\hat{n})(\hat{r}\circ\hat{s})\hat{r} - (\hat{r}\circ\hat{n})\hat{s} - (\hat{r}\circ\hat{s})\hat{n}]\exp\left(\frac{i\omega r}{\beta}\right)F(\omega) \qquad (3)$$

where $$r = |\vec{r}| \qquad (4)$$
$$s = |\vec{s}|$$

and $$\hat{r} = \frac{\vec{r}}{r} \qquad (5)$$
$$\hat{s} = \frac{\vec{s}}{s}$$

and the symbol, ∘, denotes the scalar(inner) product of two vectors. It can be seen by inspection of equation 2 that the particle motion of the P wave is parallel to the unit vector, $\hat{r}$. Whereas:

$$\vec{U}^{FS}(\omega, r)\circ\hat{r} = \qquad (6)$$
$$-\frac{i\omega s A}{4\pi\beta r}[2(\hat{r}\circ\hat{n})(\hat{r}\circ\hat{s}) - (\hat{r}\circ\hat{n})(r\circ\hat{s}) - (\hat{r}\circ\hat{s})(\hat{r}\circ\hat{n})]\exp\left(\frac{i\omega r}{\beta}\right)F(\omega) = 0$$

which demonstrates that the particle motion of the S wave is perpendicular to $\hat{r}$. Now let $\hat{p}$ be a unit vector which is perpendicular to $\vec{r}$ and which lies in a vertical plane. Similarly let $\hat{q}$ be a unit vector which is perpendicular to $\vec{r}$, but which lies in a horizontal plane. The components of $\vec{U}^{FS}(\omega, \vec{r})$ which are parallel to $\hat{p}$ and $\hat{q}$ are $$U^{FSv}(\omega, r) = \qquad (7)$$
$$\vec{U}^{FS}(\omega, r)\circ\hat{p} = \frac{i\omega s A}{4\pi\beta r}[(\hat{r}\circ\hat{n})(\hat{s}\circ\hat{p}) + (\hat{r}\circ\hat{s})(\hat{n}\circ\hat{p})]\exp\left(\frac{i\omega r}{\beta}\right)F(\omega)$$

$$U^{FSh}(\omega, r) = \qquad (8)$$
$$\vec{U}^{FS}(\omega, r)\circ\hat{q} = \frac{i\omega s A}{4\pi\beta r}[(\hat{r}\circ\hat{n})(\hat{s}\circ\hat{q}) + (\hat{r}\circ\hat{s})(\hat{n}\circ\hat{q})]\exp\left(\frac{i\omega r}{\beta}\right)F(\omega)$$

and are commonly referred to as the Sv, and the Sh components of the far field S wave spectrum. The corresponding P, Sv, Sh and total S displacement amplitude spectra provide the theoretical basis for the study whose results are reported in this document. These spectra are given by:

$$\left|\vec{U}^{FP}(\omega, r)\right| = \frac{\omega s A}{4\pi\alpha r}\left|\left[\left(1 - 2\frac{\beta^2}{\alpha^2}\right)(\hat{n}\circ\hat{s}) + 2\frac{\beta^2}{\alpha^2}(\hat{r}\circ\hat{n})(\hat{r}\circ\hat{s})\right]\right||F(\omega)| \qquad (9)$$

$$\left|\vec{U}^{FSv}(\omega, r)\right| = \frac{\omega s A}{4\pi\beta r}|(\hat{r}\circ\hat{n})(\hat{s}\circ\hat{p}) + (\hat{r}\circ\hat{s})(\hat{n}\circ\hat{p})||F(\omega)| \qquad (10)$$

$$\left|\vec{U}^{FP}(\omega, r)\right| = \frac{\omega s A}{4\pi\beta r}|(\hat{r}\circ\hat{n})(\hat{s}\circ\hat{q}) + (\hat{r}\circ\hat{s})(\hat{n}\circ\hat{q})||F(\omega)| \qquad (11)$$

$$\left|\vec{U}^{FS}(\omega, r)\right| = \frac{\omega s A}{4\pi\beta r}|2(\hat{r}\circ\hat{n})(\hat{r}\circ\hat{s})\hat{r} - (r\circ\hat{s})\hat{n} - (\hat{r}\circ\hat{n})\hat{s}||F(\omega)| \qquad (12)$$

Let $R^{Sv}$, and $R^{Sh}$, $R^S$ be the ratios of the Sv, Sh amplitude spectra and total S amplitude spectra to the P amplitude spectra. Then $$R^{Sv} = k^3\left|\frac{(\hat{r}\circ\hat{n})(\hat{s}\circ\hat{p}) + (\hat{r}\circ\hat{s})(\hat{n}\circ\hat{p})}{(k^2 - 2)(\hat{n}\circ\hat{s}) + 2(\hat{r}\circ\hat{n})(\hat{r}\circ\hat{s})}\right| \qquad (13)$$

$$R^{Sh} = k^3\left|\frac{(\hat{r}\circ\hat{n})(\hat{s}\circ\hat{q}) + (\hat{r}\circ\hat{s})(\hat{n}\circ\hat{q})}{(k^2 - 2)(\hat{n}\circ\hat{s}) + 2(\hat{r}\circ\hat{n})(\hat{r}\circ\hat{s})}\right| \qquad (14)$$

and $$R^S = \left[(R^{Sv})^2 + (R^{Sh})^2\right]^{\frac{1}{2}} \qquad (15)$$

where $$k = \frac{\alpha}{\beta} \qquad (16)$$

Notice that if the source location is presumed known then the parameters $k, \hat{r}, \hat{p}$, and $\hat{q}$ may also be presumed to be known. Therefore, the unknown vectors in equations 13, 14. and 15, may be obtained by inversion of experimental measurements of $R^{Sv}$, $R^{Sh}$ and $R^S$. However, it is important to note that $\hat{n}$ and $\hat{s}$ may be interchanged in equations 13 and 14 without affecting the values of $R^{Sv}$, $R^{Sh}$ and $R^S$. This is an ambiguity which is inherent to all seismic source mechanism inversion methods. Thus, the components of $\hat{n}$ and $\hat{s}$ cannot be uniquely determined from the measured data without the imposition of additional constraints. A simple constraint which allows the unique determination of the orientation of the horizontal component of $\hat{n}$ and $\hat{s}$ is identified and discussed below.

INVERSION OF S/P AMPLITUDE RATIO DATA

Figure 3:
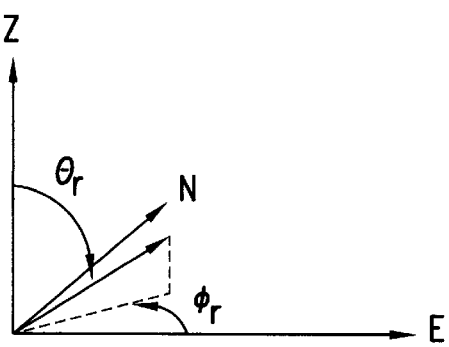
FIG. 3 is a graph that illustrates the angles specifying the direction of a vector in the ENZ Cartesian Coordinate System.

Choose a coordinate system such that the positive Z axis is directed vertically upward and the positive E and N axes are directed in the geographic east and north directions, respectively. As shown in FIG. 3 the direction of the unit vector, $\hat{r}$, is specified in the ENZ coordinate system by the angle, $\theta_r$ and $\phi_r$. Therefore:

$$\hat{r} = \sin\theta_r\cos\phi_r\hat{e}_E + \sin\theta_r\sin\phi_r\hat{e}_N + \cos\theta_r\hat{e}_Z \qquad (17)$$

where the set $\{\hat{e}_E, \hat{e}_N, \hat{e}_Z\}$ are the base vectors of the coordinate system. Similarly;

$$\hat{n} = \sin\theta_n\cos\phi_n\hat{e}_E + \sin\theta_n\sin\phi_n\hat{e}_N + \cos\theta_n\hat{e}_Z \qquad (18)$$

and $$\hat{s} = \sin\theta_s\cos\phi_s\hat{e}_E + \sin\theta_s\sin\phi_s\hat{e}_N + \cos\theta_s\hat{e}_Z \qquad (19)$$

A principal objective of the invention is to develop a method for the estimation of $\hat{n}$ and $\hat{s}$ for a microseismic event, given its source coordinates and measurements of $R^{Sv}$, $R^{Sh}$ and $R^S$ at J observation points whose coordinates are also known. Since the amplitude ratios are non-linear and oscillatory functions of n̂ and ŝ, the familiar linear or linearized inversion schemes are not applicable to this particular problem. Therefore, a simple non-linear strategy was adopted to address the inversion problem. The essential elements of this strategy are:

Calculate predicted values of $R^{Sv}$, $R^{Sh}$ and $R^S$ for each observation point and for a large number of realizable combinations of n̂ and ŝ. Then:

Find the combination of n̂ and ŝ which minimizes the differences between the observed and predicted values of $R^{Sv}$, $R^{Sh}$ and $R^S$ at all observation points.

Figure 4:
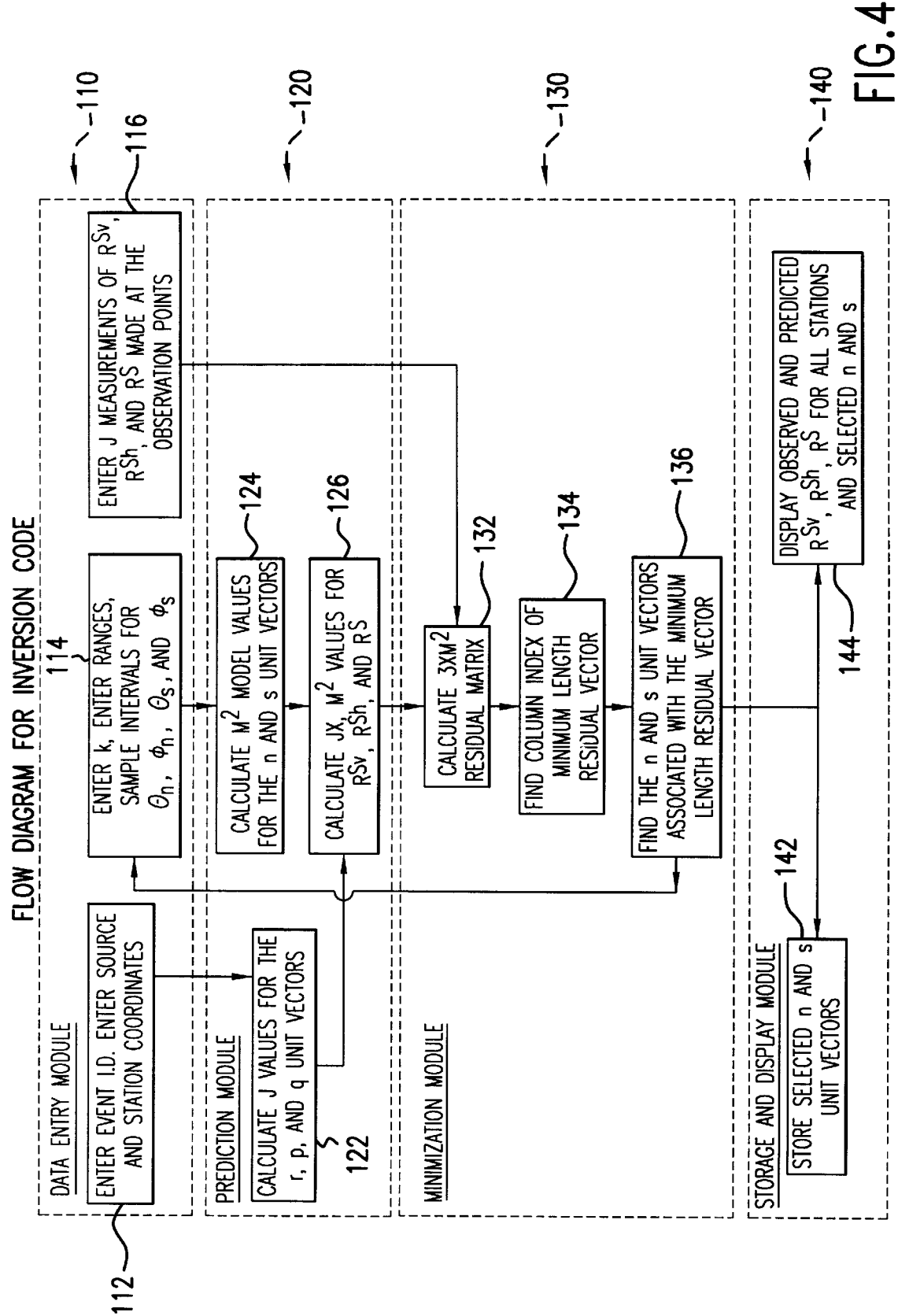
FIG. 4 is a flow diagram of the inversion code developed to derive estimates of the orientation of the normal to the fracture plane and orientation of the movement of one fracture surface relative to the other.

A computer code has been written to apply this strategy, and a flow diagram identifying the functional modules of the computer code is shown in FIG. 4. The components contained within each module are briefly described in the following paragraphs.

It can be seen from FIG. 4 that a Data Entry module 110 contains three components 112, 114, 116. The coordinates of the source ($E_0$, $N_0$, $Z_0$) are entered as a 3 element row vector and the coordinates of the J observation points($E_j$, $N_j$, $Z_j$) are entered as a JX3 matrix in one of the components. A second component is used for the entry of the values of amplitude ratios measured at the observation points and expressed in db. The final component in this module is used for the specification of the seismic velocity ratio,k, which characterizes the source region. This component is also used for the entry of the desired ranges of the variables $\theta_n$, $\phi_n$, $\theta_s$, and $\phi_s$, and the sample intervals that are to be used for the calculation of trial values for n̂ and ŝ.

A Prediction module 120 also contains three components 122, 124, 126. One component of this module is used for the calculation of the $\hat{r}_j$, $\hat{p}_j$ and $\hat{q}_j$. Since the version of the code used for this invention assumes a constant velocity propagation model;

$$\hat{r}_j = \frac{1}{r_j}[(E_0 - E_j)\hat{\varepsilon}_E + (N_0 - N_j)\hat{\varepsilon}_N + (Z_0 - Z_j)\hat{\varepsilon}_Z] \quad (20)$$

where $$r_j = [(E_0 - E_j)^2 + (N_0 - N_j)^2 + (Z_0 - Z_j)^2]^{\frac{1}{2}} \quad (21)$$

$\hat{p}_j$ is derived from $\hat{r}_j$ using the relationships $$\hat{p}_j \circ \hat{r}_j = 0 \quad (22)$$

and $$\gamma^p_{Nj} = \gamma^p_{Ej} N_0 - \frac{N_j}{E_0 - E_j} \quad (23)$$

where $y^P_{Nj}$ and $y^P_{Ej}$ are the N and E direction cosines of $\hat{p}_j$. Then $\hat{q}_j$ is computed from $\hat{p}_j$ and $\hat{r}_j$ using the relationship;

$$\hat{q}_j = \hat{r}_j \times \hat{p}_j \quad (24)$$

where the symbol, x, denotes a vector (cross) product A second component within this module uses information from the data entry module to calculate the data vectors θ and $\phi_s$. The elements of these vectors are then used in equations 18 and 19 to calculate $M^2$ values for both for n̂ and ŝ; where M is the product of the lengths of the θ and φ data vectors.

The third component of this module uses the previously created values of $\hat{r}_j$, $\hat{p}_j$ and $\hat{q}_j$ as well as the $M^2$ values for both n̂ and ŝ in equations 13, 14, and 15 to generate 3 $M^2$XJ matrices containing the predicted values of $R^{Sv}$, $R^{Sh}$, and $R^S$ expressed in db for all observation points.

A Minimization module 130 contains three components 132, 134, 136. One component retrieves the J measurements of $R^{Sv}$, $R^{Sh}$ and $R^N$ stored in the Data Entry module 110. It also retrieves the predicted values of these variables from the Prediction module 120. These data values are then used to calculate the elements of the 3X$M^2$ Residual Matrix. Each column in this matrix is referred to as a Residual Vector. The elements of the $m^{th}$ Residual Vector (m=1⋯$M^2$), are the median values of the absolute value of the differences between the observed and predicted values of $R^{Sv}$, $R^{Sh}$ and $R^S$ for the $m^{th}$ model. A second module is used to calculate the length (magnitude) of the $M^2$ Residual Vectors. An algorithm is then applied to find the column index of the minimum length Residual Vector. The third component of this module uses this index to find the model values of n̂ and ŝ associated with the minimum length Residual Vector. As shown by the loop in FIG. 4, the user may iterate the prediction and minimization processes at his discretion. This option is used when computer memory is inadequate to calculate and temporarily store the desired number of model values $R^{Sv}$, $R^{Sh}$ and $R^S$ in one pass.

Figure 5A:
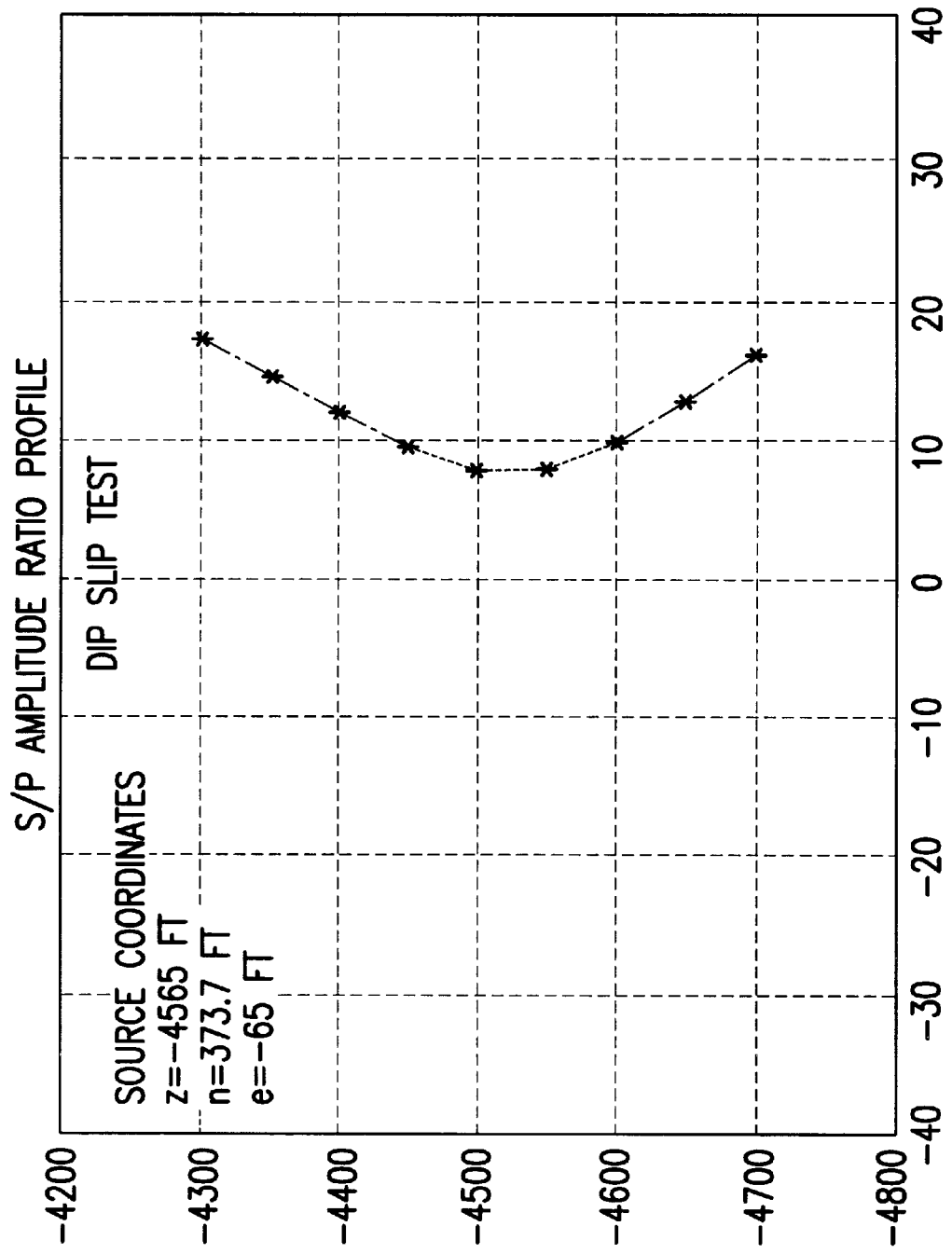
FIGS. 5A and 5B are graphs illustrating simulated measured and predicted amplitude ratio profiles when a vertical array of observation points were separated by approximately 50 feet.
Figure 5B:
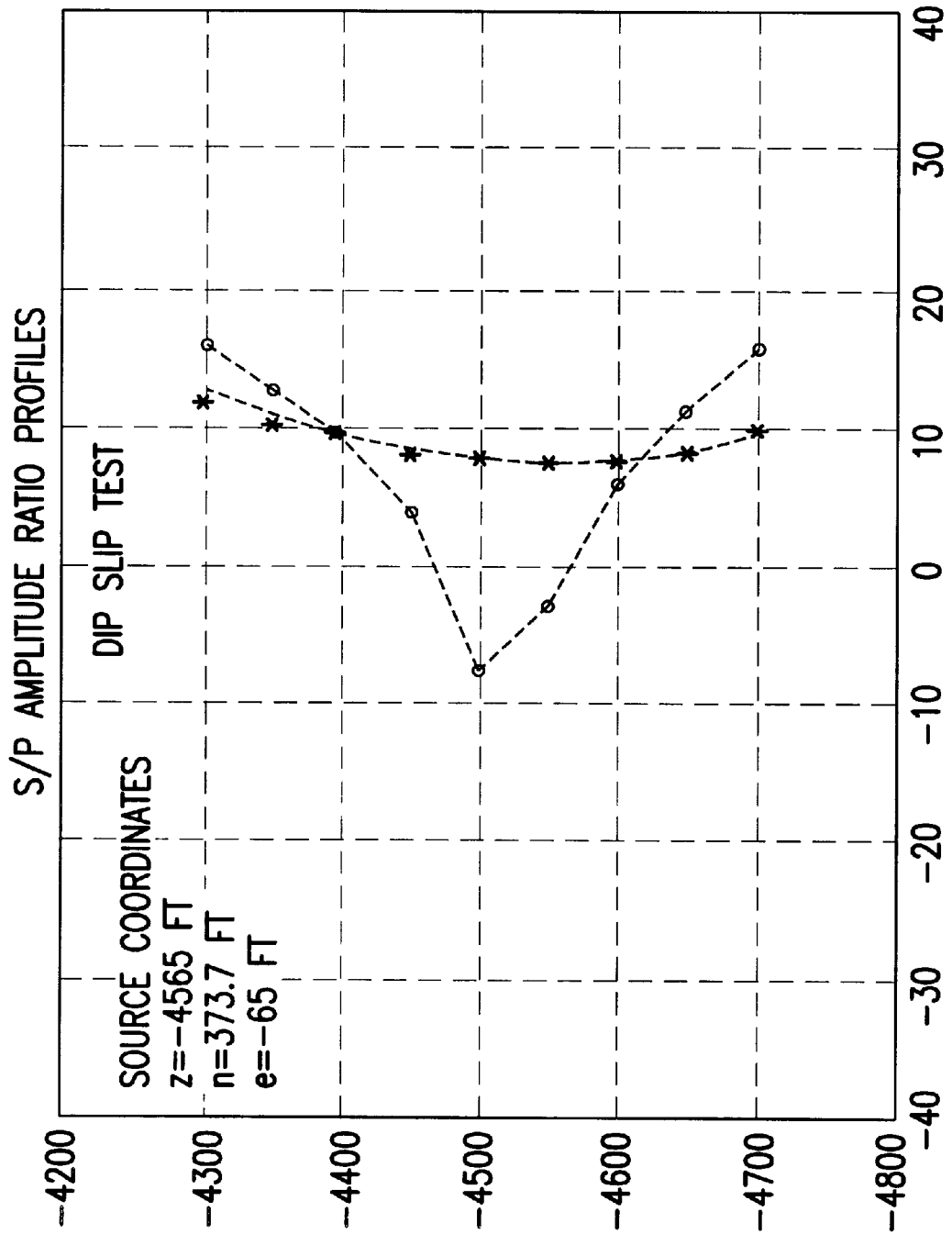

A Storage and Display module 140 contains two components 142, 144. One component 142 is used to save the results of the inversion processing in a file named mecs.mat. The other component 144 creates 2 graphics files which are used for the visual comparison of observed values of $R^{Sv}$, $R^{Sh}$ and $R^S$ with those calculated for the model values of n̂ and ŝ associated with the minimum length Residual Vector. An example of the graphical output of the code is shown in FIG. 5 for a hypothetical dip slip source test case. The true values of $\theta_{IP}$ $\phi_{IP}$ $\theta_P$ and $\phi_s$ for the dip slip test case are compared with those found by the inversion code in Table 1.

In order to simulate conditions likely to be encountered during the microseismic monitoring of a fluid injection project, the observation points may be deployed in a single 9 element vertical array with a station separation of approximately 50 feet. Thus the aperture of the array is approximately 400 feet. The dip slip source was placed north north-east of the source at a depth near the depth of the midpoint of the array and at a range of approximately 379 feet. The results shown in FIGS. 5A and 5B and Table 1 indicate that the inversion code has the capability to yield accurate results under simulated ideal field conditions. Its behavior under more realistic constraints is examined in the following section.

TABLE 1

Comparison of the true bearing and dip angles of n̂ and ŝ with those estimated by the inversion code for the dip slip test case.

| | $\theta_n$ | $\phi_n$ | $\theta_s$ | $\phi_s$ |
| --- | --- | --- | --- | --- |
| True | 70° | 55° | 72° | 139° |
| Estimated | 67° | 56° | 75° | 140° |
| Error | 3° | −1° | −3° | −1° |

Description of Test Procedures.

Figure 6:
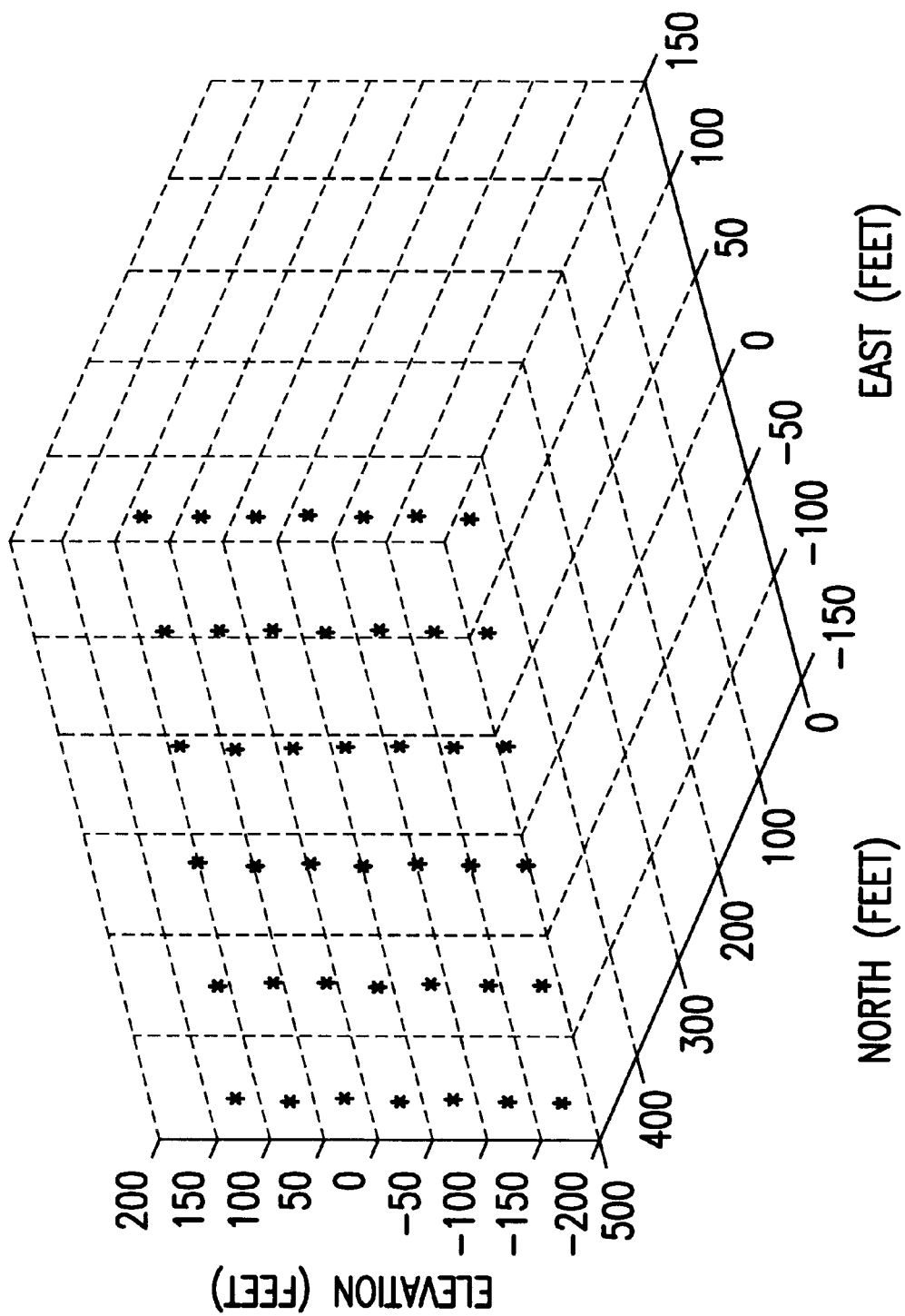
FIG. 6 is a graph illustrating the spatial configurations of a hypothetical microseismic source distribution and monitoring system.

Numerical studies have been undertaken to evaluate the theoretical performance of the inversion code when applied to S/P amplitude ratio data acquired under simulated field conditions. The basic field problem addressed by these studies is the observation of microseismic activity stimulated by a hydraulic fracturing treatment. The observations are presumed to be made with a commercially available microseismic monitoring system which is deployed in a nearby well. The spatial configurations of the hypothetical microseismic source distribution and the monitoring system are shown in FIG. 6.

The monitoring system includes five elements which are deployed in a vertical well. The center element of this array is chosen to be the origin of the ENZ coordinate system used for these studies. The interval between the individual elements of the array is approximately 100 feet. Thus, the aperture of the array is approximately 401 feet. The hypothetical treatment well is located north of the monitor well. For the majority of the tests undertaken during these studies, the distance between the simulated treatment and monitor wells was taken to be equal to the aperture of the observation point array (400 feet.). However, for 3 tests, simulations were performed for distances of 200,800, and 1600 feet. These particular tests were undertaken to determine if plausible variations in this parameter would have a significant impact upon the estimation of the components of the fracture normal and slip vectors using the inversion code.

The base microseismic source distribution is simulated by a 7×7 vertically oriented array which strikes N70°W. The interval between elements of the array is approximately 50 feet and the coordinates of the center element are (0,L,0), where L is the distance between the hypothetical treatment and monitor wells. It is important to note that the vertical dimension of the observation point array overlaps the vertical dimension of the source array by approximately 50 feet in both the positive and negative Z directions.

Figure 7:
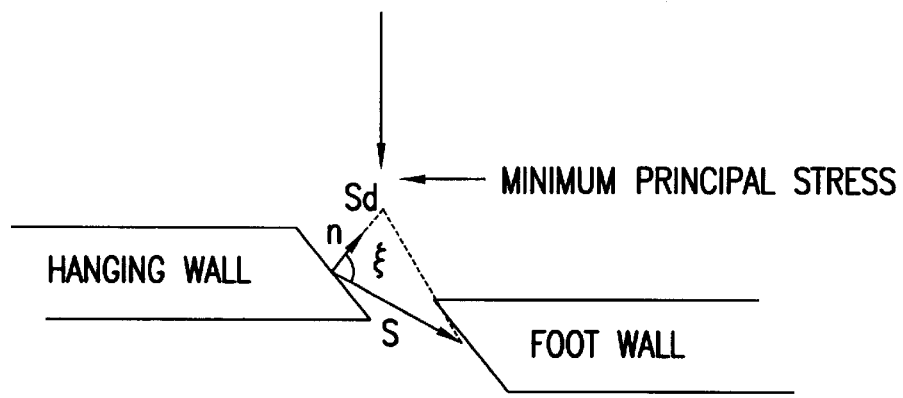
FIG. 7 is a cross-sectional view of a dilatant fracture in an extensional stress regime.

With the exception of two tests, the microseismic sources used in the simulation studies were presumed to occur in an extensional stress regime. The maximum principal stress in this regime is vertically oriented and $\hat{n}$ and $\hat{s}$ are constrained to lie in the same vertical plane. Consequently, a failure at any given point in this regime can be fully described by the determination of three angles, the bearing, $\phi_{IP}$ and dip, $\theta_{IP}$ of the fracture normal,$\hat{n}$, and the angle,$\zeta$, between $\hat{n}$ and $\hat{s}$. As shown in FIG. 7.

$$\xi = \cos^{-1}(\hat{n} \circ \hat{s}) = \cos^{-1}\left(\frac{s_d}{s}\right) = \cos^{-1}(D) \tag{25}$$

where $s_d$ is referred to as the dilatant component of $\vec{s}$ and D is defined to be the dilatancy ratio (i.e., the ratio of the length of the dilatant component of the slip to the total length of the slip). For the purposes of the simulation studies, the output of the inversion code was reconfigured to yield estimates of ($\phi_n, \theta_{IP}$ and D.

To simulate a set of extensional fractures activated by fluid injection, the bearing and dip angles of the fracture normal were held constant for each point in the source array for a given test. The dilatancy ratio was then systematically varied at each point in the source array to simulate failure conditions ranging from pure shear (D=0) to pure tension (D=1). Theoretical values of $R^{Sv}$, $R^{Sh}$ and $R^S$ were calculated for each failure condition, each source point and each observation point. The velocity ratio,k, was held constant at a value of 1.68 for all of these calculations. Random noise was added to each calculated amplitude ratio to simulate measurement errors. The simulated measurement errors were drawn from a uniformly distributed population whose maximum and minimum values were +3 db and −3db. respectively. The results of these calculations for a single test are three 5×294 matrices which simulate the experimentally derived values of $R^{Sv}$, $R^{Sh}$ and $R^S$ for the 294 microseismic events in the activated fracture zone set and as seen at the 5 observation points in the monitoring array 22 (See FIG. 1). These data were reorganized into two hundred ninety four 3×5 matrices of amplitude ratios which were serially input to the Data Entry Module 110 of the inversion code.

Noise was also added to the azimuth, the range and elevation of each of the source points and for each failure conditions in order to simulate errors associated with the estimation of microseismic source coordinates. In this case, however, the magnitudes of the noise components were held constant, while their signs were randomly assigned for each source point and failure condition. For a plurality of numerical studies undertaken, the magnitudes of the azimuth, range, and elevation errors were assumed to be 2.5°, 15 feet, and 15 feet, respectively. These values characterize what would be termed "good" microseismic source locations. The perturbed coordinates were then calculated for each source point and each failure condition and were used as the estimated source coordinates by the inversion code. The coordinates of the observation points and the value of k were assumed to be known and were entered without added errors into the inversion code.

After some preliminary experiments, the inversion code was set to run for two iterations. The settings of the $\theta_{IP}$ $\phi_{IP}$ $\theta_N$, and $\phi_s$ data vectors for each iteration are listed in Table 2. These settings were used for all tests.

TABLE 2

Test Settings for the $\theta_n$, $\theta_n$, $\theta_s$, and $\phi_s$ Data vectors.

| Data Vector | Iteration #1 | | | Iteration # 2 | |
|---|---|---|---|---|---|
| | Length | Range | Sample Interval | Range | Sample Interval |
| $\theta_n$ | 12 | 30°:180° | 12.5° | $(\theta_{nl}) - 12.5°:(\theta_{nl}) + 12.5°$ | 2.1° |
| $\phi_n$ | 15 | 0°:180° | 12° | $(\theta_{nl}) - 12.0°:(\theta_{nl}) + 12.0°$ | 1.6° |
| $\theta_s$ | 12 | 30°:180° | 12.5° | $(\theta_{sl}) - 12.5°:(\theta_{sl}) + 12.5°$ | 2.1° |
| $\phi_s$ | 15 | 0°:180° | 12° | $(\theta_{sl}) - 12.0°:(\theta_{sl}) + 12.0°$: | 1.6° | note:
the symbols $(\theta_{n,sl}),(\phi_{n,sl})$ indicate the values of $\theta_{n,s}$ and $\phi_{n,s}$ estimated during the first iteration.

Discussion of Test Results

The random measurement and location errors incorporated into the simulated field data contributes a statistical variability to the estimates of $\theta_{IP}$, $\phi_{IP}$ and D, produced by the inversion code. It should also be recalled that the simulated observations are acquired with a vertically oriented linear array 22. Therefore, the inversion process is unconstrained in the horizontal plane. This phenomenon coupled with the finite width of the sample intervals also will produce an unpredictable variability in these estimates. Therefore, the results of each test have been summarized in terms of statistical parameters characterizing the sample populations of the estimates of $\phi_n$, $\theta_{IP}$ and D returned by the inversion code. Example of the distributions of these sample populations for a given test are shown in FIGS. 8A–8C.

Figure 8A:
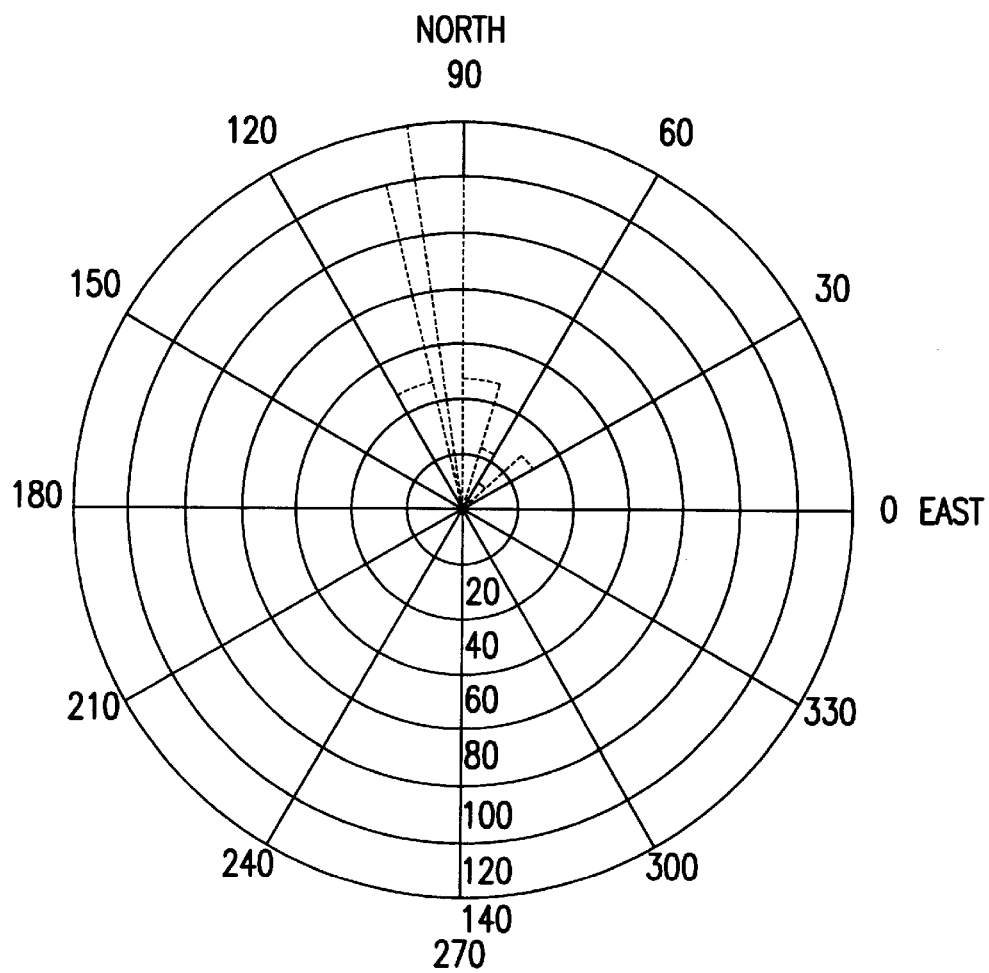
FIG. 8A is a Rose Diagram of the distribution of a sample population of fracture normal bearings returned by the inversion code for a given test.

FIG. 8A is a Rose Diagram of the distribution of the sample population of fracture normal bearings,$\phi_n$, returned by the inversion code for test #8. The true value of $\phi_n$ for this test was 100°. The divergence of the sample population from its true value, as seen in this figure, is due primarily to absence of any data constraints in the horizontal plane. However, it is important to note that despite the dispersion of the sample population, its median value,94.4°, differs from the true value by less than 6°.

Figure 8B:
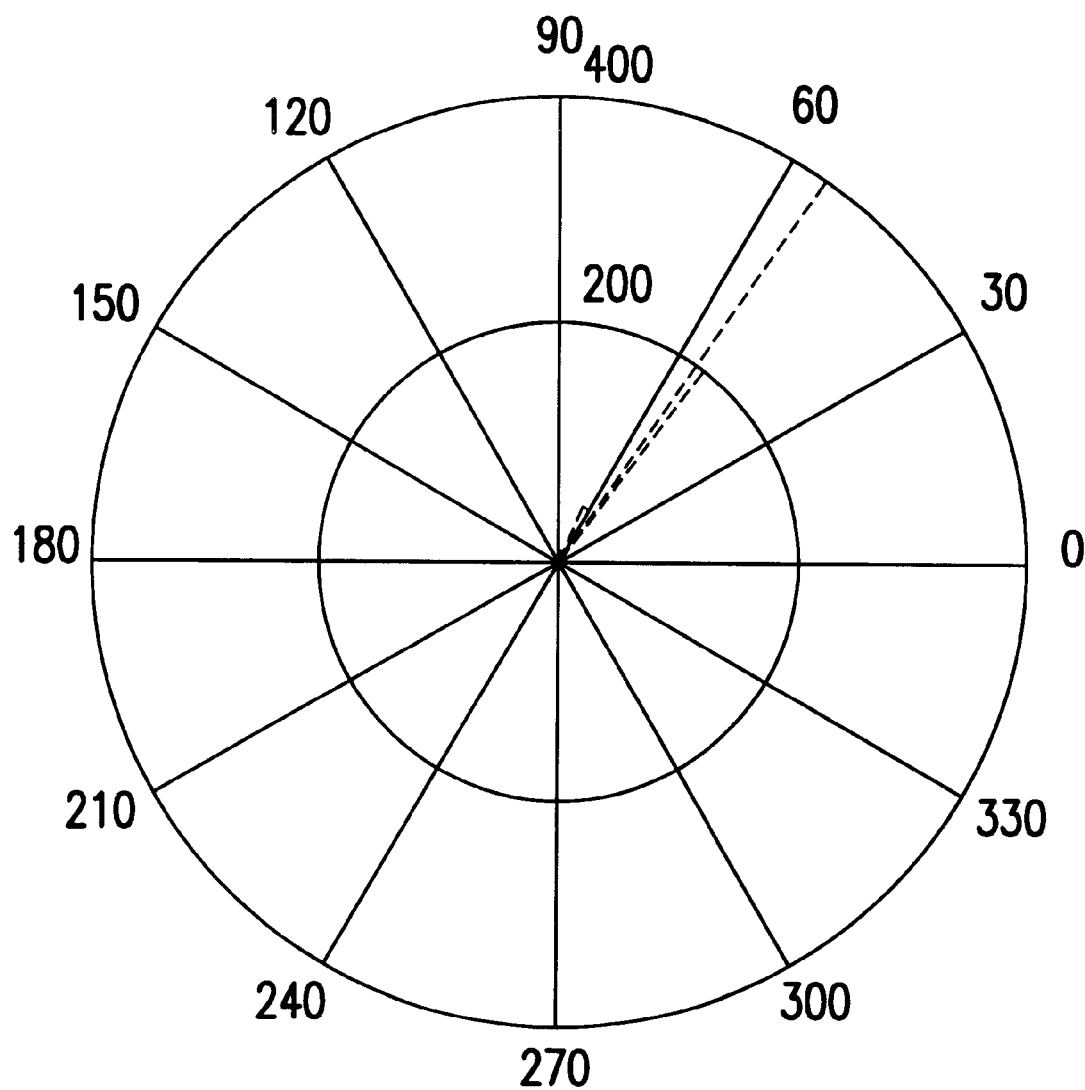
FIG. 8B is a Rose Diagram illustrating the distribution of the sample population of the fracture normal dip, for the same test as FIG. 8A.

The Rose Diagram illustrating the distribution of the sample population of the fracture normal dip,$\theta_n$, for test #8 is shown in FIG. 8B. The true value for $\theta_n$ for this test was 55°. Notice that for this variable, the sample population is tightly grouped about its true value. Its median value was found to be 57.1°, which differs from its true value by only 2.1°. These results indicate that the vertical linear array provides adequate data constraints in the vertical plane even though it contains only 5 elements.

Figure 8C:
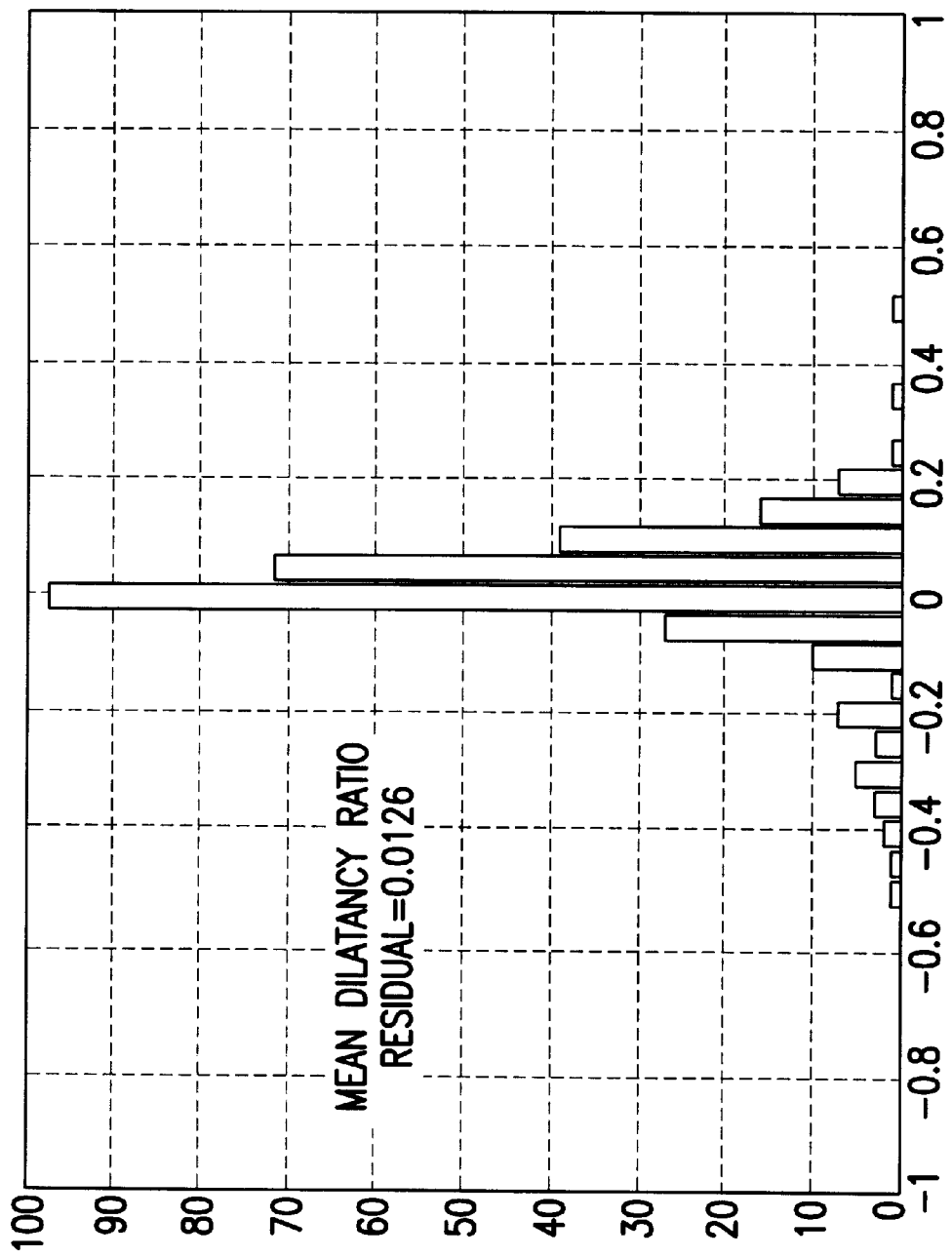
FIG. 8C is a histogram of the distribution of the sample population of a Dilatancy Ratio Residuals calculated for the test of FIGS. 8A and 8B.

A histogram of the distribution of the sample population of Dilatancy Ratio Residuals calculated for this test is shown in FIG. 8C. The Dilatancy Ratio Residual is defined to be the difference between the Dilatancy Ratio returned by the inversion code and its true value for a given source location and failure condition. Notice that the sample population clusters tightly about a near zero mean value. This observation implies that, in practice, extensional microfracture events with Dilatancy Ratios as low as about 0.2 can be classified as dilatant with a high degree of confidence, even with a single monitor array consisting of only 5 elements.

As documented by the data listed in the table depicted in FIG. 8D, the sample distributions generated during other tests show characteristics that are roughly similar to those associated with the test #8 sample populations. There are, some important differences which are identified and discussed in the following paragraphs.

A variety of different tests were performed during the simulation studies. The results of these tests were summarized in terms of the median,$\mu$, and the dispersion,$\delta$, of the $\theta_{IP}$ and $\phi_n$ sample populations, and in terms of the mean value of the residuals for the D sample populations. For a given sample population, $\delta$ is defined by $$\delta = \frac{1}{L}\sum_{l=1}^{L} |y_l - \mu| \qquad (26)$$

where $y_l$ is the $l^{th}$ sample of the population and L is the total number of samples.

Test #1 was performed under "no noise" conditions to isolate and investigate the errors that could be directly attributed to the inversion process. It can be seen from the results listed in the first row of Table 3, that apart from the dispersion of the $\phi_n$ population, these errors are negligible. As mentioned earlier, the dispersion of the $\phi_n$ population reflects the absence of data constraints in the horizontal plane. It should also be noted that the differences between the median and true values of the $\theta_{IP}$ and $\phi_n$ sample populations, as well as the mean value of the D population, are insignificant. This demonstrates that the bias introduced by the inversion process is inconsequential.

Tests #2 and #3 were performed to investigate the sensitivity of the inversion process to measurement errors(test #2) and to measurement plus location errors (test #3). Comparison of the results of these tests with the test #1 results indicate that the principal effects of random measurement and location errors are slight but acceptable increases in the dispersion of the $\theta_n$, and $\phi_n$ sample populations. as well as the introduction of a small bias to their median values. On the other hand, the small differences between the mean values of the D residual populations for tests #1 and #2 indicates that measurement and location errors have little significant impact on the estimates of the Dilatancy Ratio.

Tests #4 and #5 were performed to investigate the sensitivity of the sample population statistics to changes in the fracture dip angle. The comparison of the results of these tests with the results of prior tests indicates that the only apparent effect of changing the fracture dip angle is to increase the dispersion of the $\theta_n$ population from about 3°–4° to about 7°–8°.

Tests #6 through #8 are part of a subset of tests that were performed to investigate the sensitivity of the sample populations to changes in the fracture normal bearing angle. The results of tests #6–#8 are examples of the maximum and minimum changes observed in the population statistics generated during the performance the subset of tests. Notice that the $\phi_n$ population and, to a lesser extent, the D population are significantly sensitive to changes in the fracture normal bearing angle. In the worst cases (Tests #6 and #7) it is seen that the median values of the $\phi_n$ population can differ as much as 18° from their true values and their dispersions can be as great as 42°. In addition, it is seen that the magnitudes of the mean value of the D population residuals may be as large as 0.05. On the other hand, it is found that for the best case (test #8) the population statistics of all the variables are comparable to those observed during the "no noise" test (Test #1).

Tests #9–#11 were performed to investigate the sensitivity of the population statistics to changes in the distance between the monitor and source arrays. Notice that as the distance is increased beyond 400 feet (Tests #9 and #10) the dispersion of the $\theta_{IP}$ and $\phi_n$ sample populations as well as the bias of their median values tend to increase. A small, but significant increase in the magnitude of the mean value of the D residuals is also observed to occur as the distance is increased. Conversely, the results of Test #11 indicate that with the possible exception of the dispersion of the $\phi_n$ population, a reduction of the distance between source and monitor arrays below 400 feet has no significant effect on the sample population statistics.

Tests #12 and #13 were performed to investigate the sensitivity of the population statistics to a change from an extensional to a compressional stress regime. In order to simulate "worst case conditions", it was assumed was that the intermediate principal stress axis was vertically oriented. In this case the fracture normal and the slip vector lie in a horizontal plane. In order to isolate the effects of a change in stress regimes, the results of Tests #11 and #12 should be compared to the Test #5 and #6 results which were performed with similar values of the fracture normal bearing angle. On the basis of these comparisons it can be seen that the primary effect of a change in the stress regime from extensional to compressional is to increase the magnitude of the mean values of the Dilatancy Ratio Residuals.

MEASUREMENT OF S/P AMPLITUDE RATIOS

A method for the experimental measurement of S/P amplitude ratios was developed for microseismic applications as a part of this research project. The theoretical basis for the method is illustrated in FIG. 9. The curves shown in this figure are hypothetical P, Sv and Sh displacement amplitude spectra. In order to simulate conditions that could be encountered in the microseismic monitoring of fluid injection projects, the distance between the observation point and the active fracture was assumed to be 400 feet and the maximum dimension of the induced microfracture was assumed to be approximately 10 feet. Notice that the two vertical lines seen in FIG. 9 subdivide the spectra into 3 frequency bands.

In Band 1, the wavelengths of the P and S waves are comparable to or greater than the distance between the source and observation point. Consequently, the near and intermediate field components of the P and S waves are the dominant contributors to the observed spectra in this band. In Bands 2 and 3, the far field P and S components are the primary contributors to the observed spectra. However, in Band 2 their wavelengths are large compared to the maximum source dimensions; whereas in Band 3, their wavelengths are comparable to or less than the maximum source dimension.

Now, it should be recalled that the theoretical expressions for the S/P amplitude ratios were developed subject to the constraints that:

1. The wavelengths of the P and S waves must be short compared to the distance between the source and the observation point.
2. The wavelengths of the P and S waves must be large compared to the maximum dimension of the source.

It follows, then, that the experimental measurements necessary for the calculation of S/P amplitude ratios must be confined to Band 2 in order to insure agreement with the theoretical models. Band 2 is referred to as the "far field, point source" band in the following paragraphs.

Figure 10:
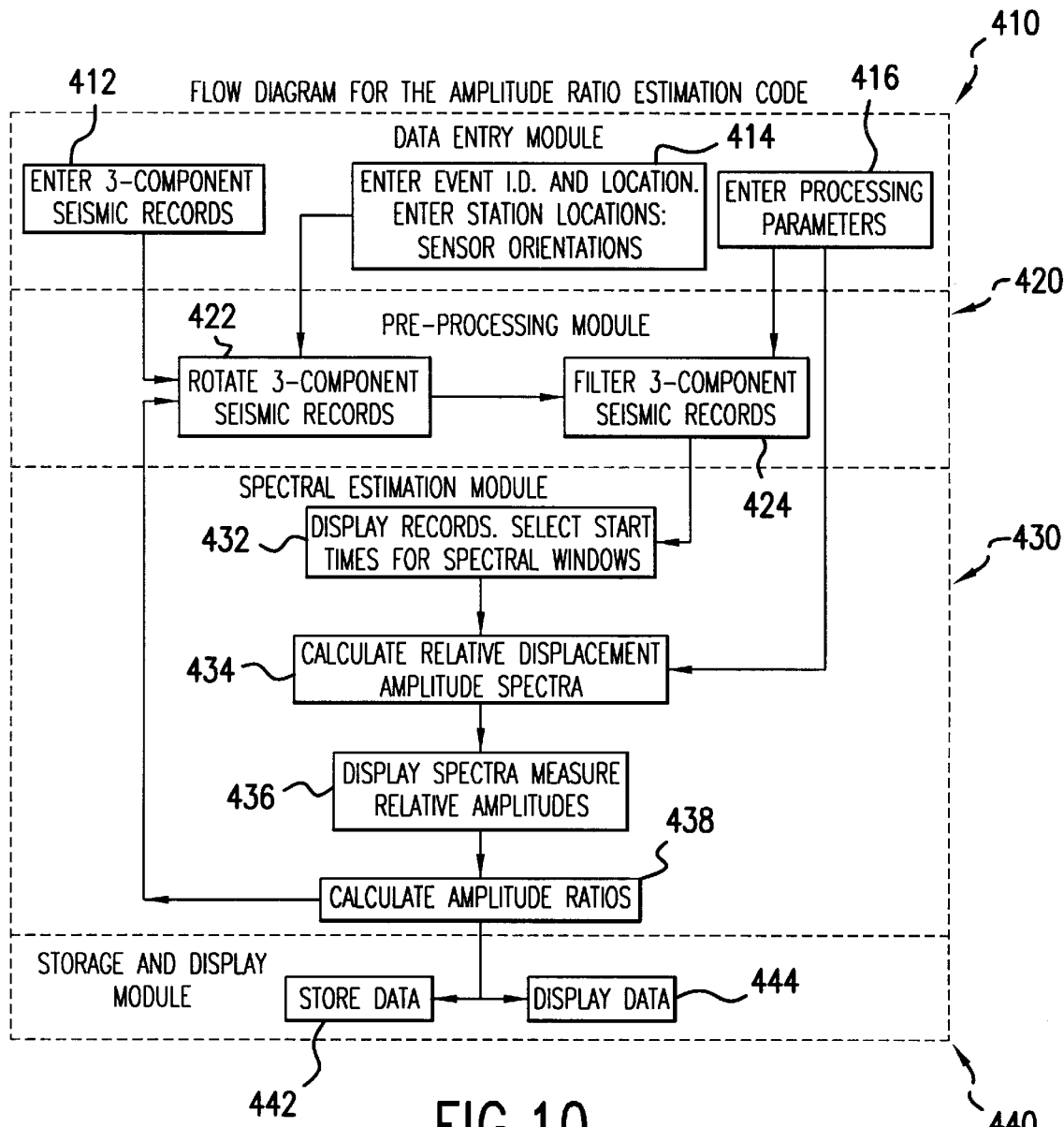
FIG. 10 is a flow diagram for an amplitude ratio estimation code.

An interactive computer code which allows the observer to identify and constrain amplitude measurements to this band has been written and a flow diagram identifying its functional modules is shown in FIG. 10.

A Data Entry module 410 contains 3 components 412, 414, 416. One component is used to enter information concerning the microseismic event whose records are to be used for the calculation of S/P amplitude ratio. This information may include:

1. the event name;
2. the coordinates of the estimated event location;
3. the coordinates of the stations which recorded the event;
4. the orientations of one of the horizontal axes of the 3-axis transducers deployed at the stations.

A second component loads the file containing the 3-axis seismograms recorded at the stations in the network. This file is loaded as a Px3J matrix where P is the number of points and J is the number of stations. A third component is used to enter the values of the parameters which will control the process. These include:

1. the sample rate;
2. the order and corner frequencies of a Butterworth bandpass filter;
3. the compressional and shear wave velocities for the medium;
4. the compressional and shear dissipation constants;
5. the lengths of the P and S data windows
6. the lengths of the P and S spectral amplitude averaging windows.

A Preprocessing module 420 contains two sequentially linked components 422, 424. The first component serially loads the 3-axis seismograms from each station. It then uses the source and station location data as well as the horizontal transducer axis orientation to numerically align the horizontal seismograms in each 3-axis set in directions radial and transverse to the direction from the source to the observation point. The second component acquires the appropriate data from the Data Entry Module 410 and computes, then applies a Butterworth bandpass filter to the rotated seismograms received from the first component.

A Spectral Estimation module 430 contains four sequentially linked components 432, 434, 436, 438. The first component receives the aligned and filtered seismograms from the Pre-Processing Module 420 for the selected station, then displays them on the monitor screen. The operator uses this display to pick the start points for the spectral estimation data windows for samples of Noise, and the P, Sh and Sv seismic phases. This is accomplished by sequentially positioning the cursor on the selected points on the seismograms, then pressing the left mouse button. After selection of the final start point process control is automatically shifted to the second component in the sequence. This component uses the 3-axis data in each of the spectral windows to calculate estimates of the relative P, Sv, Sh and Noise displacement amplitude spectra. For the purposes of these calculations, it is assumed that the frequency responses of the elements of the 3-axis transducers are identical and flat with respect to acceleration inputs. The following relationships are used to derive the spectral estimates. Let $Z_p(f)$ and $R_p(f)$ be the power spectral density estimates derived from the vertical and radial seismograms in the P spectral window. If $U_p(f)$ is the relative P displacement amplitude spectra, then;

$$U_p(f) = \frac{[Z_p(f) + R_p(f)]^{\frac{1}{2}}}{4\pi^2 f^2} \quad (27)$$

where f is the frequency.

Similarly, if $U_{Sv}(f)$ is the relative Sv displacement amplitude spectra. then;

$$U_{Sv}(f) = \frac{[Z_{Sv}(f) + R_{Sv}(f)]^{\frac{1}{2}}}{4\pi^2 f^2} \quad (28)$$

were the Sv subscript indicates the use of the data in the Sv spectral window.

Now let $T_{Sh}(f)$ be the power spectral density estimate derived from the transverse seismogram in the Sh spectral window. If $U_{Sh}(f)$ is the relative Sv displacement amplitude spectra, then $$U_{Sh}(f) = \frac{\sqrt{T_{Sh}(f)}}{4\pi^2 f^2} \quad (29)$$

Finally, let $U_{nr}(f)$ and $U_{nt}(f)$ be relative Noise displacement amplitude spectra in the P-Sv plane and in the transverse direction, respectively, Then $$U_{Nr}(f) = \frac{[Z_N(f) + R_N(f)]^{\frac{1}{2}}}{4\pi^2 f^2} \quad (30)$$

and;

$$U_{Nt}(f) = \frac{\sqrt{T_N(f)}}{4\pi^2 f^2} \quad (31)$$

After completion of the spectral estimations, P and S attenuation correction factors are calculated and applied to the relative P, Sv, and Sh displacement amplitude spectra. The attenuation correction factors, $C_\alpha(f,r_j)$ and $C_\beta(f,r_j)$ are defined by;

$$C_\alpha(f, r_j) = \exp\left(\frac{\pi f r_j}{\alpha Q_\alpha}\right) \quad (32)$$

and $$C_\beta(f, r_j) = \exp\left(\frac{\pi f r_j}{\beta Q_\beta}\right) \quad (33)$$

where $Q_\alpha$ and $Q_\beta$ are the compressional and shear dissipation constants, respectively.

The third component 436 in the linked series plots the estimated relative displacement amplitude spectra in two sequential screen displays. The corrected P displacement amplitude spectrum is compared to the spectrum of the noise in the P-Sv plane in the first screen. The observer uses this screen to identify "far field, point source" band at this station and to pick the start point for the P spectral amplitude averaging window. He does this by positioning the cursor on the selected point within the "far field, point source" band then pressing the left mouse button. This action results in the calculation of the average P spectral amplitude in the selected window. The second screen is activated by pressing any key. The corrected Sh, Sv and S displacement spectra are compared to the spectra of the noise in the P-Sv and Sh planes in this screen. The observer uses it to pick the start point for the Sh, Sv and S spectral amplitude averaging windows within the "far field, point source" band. He does this by sequentially positioning the cursor on the selected points, then pressing the left mouse button. This action results in the calculation of the average Sh, Sv and S spectral amplitudes in the selected windows. Control is passed to the next component in the sequence by pressing any key. This component is used to calculate the Sh/P, Sv/P and S/P amplitude ratios. After completion of this task, control is returned to the Pre-Processing Module 420 and processing is initiated on the seismo, rams from the next station. These procedures are repeated until amplitude ratios have been computed for all stations in the network which recorded usable data from the event.

After completion of the processing of all station data, the results are sent to a Storage and Display module 440, where one component 442 is used to store the measured amplitude ratios in a user-designated file together with the coordinates of the observation points. Another component 444 in this module generates a final screen which displays the stored data for review by the user.

EXPERIMENTAL RESULTS

Monitor Well Observations

A microseismic data set acquired during the execution of an injection experiment was used to test the application of the previously described methods to real data. After a review of the seismograms of 89 events comprising this data set, the records of 53 events were selected for the test. The events in the sample population satisfy the following criteria:

1. The P and S signal to noise ratios were greater than 6 db at 4 or more stations in the monitoring array.
2. The aperture formed by the "good" signal to noise ratio stations was equal to or greater than 300 feet.

Figure 11:
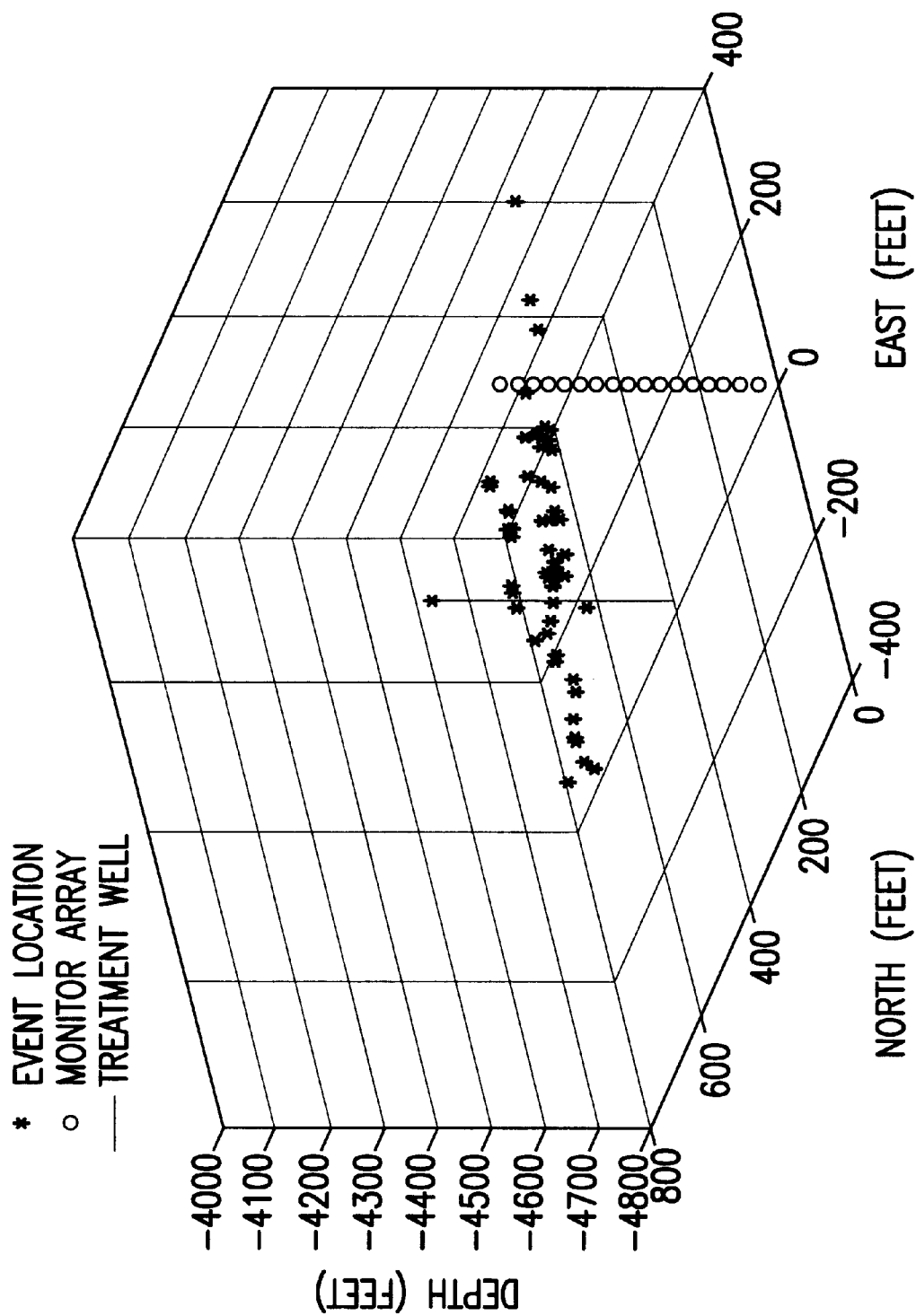
FIG. 11 is a graph showing the estimated locations of actual microseismic events with respect to the actual observation and injection well used in a test to validate one embodiment of the invention.

The estimated locations of the events in this subset with reference to an ENZ coordinate system fixed in the monitor well arc shown in FIG. 11 as asterisks. The circles seen in this figure represent the locations of the 15 transducers in the monitor array that were used for this experiment. The position of the treatment well is shown by the vertical line.

Figure 12A:
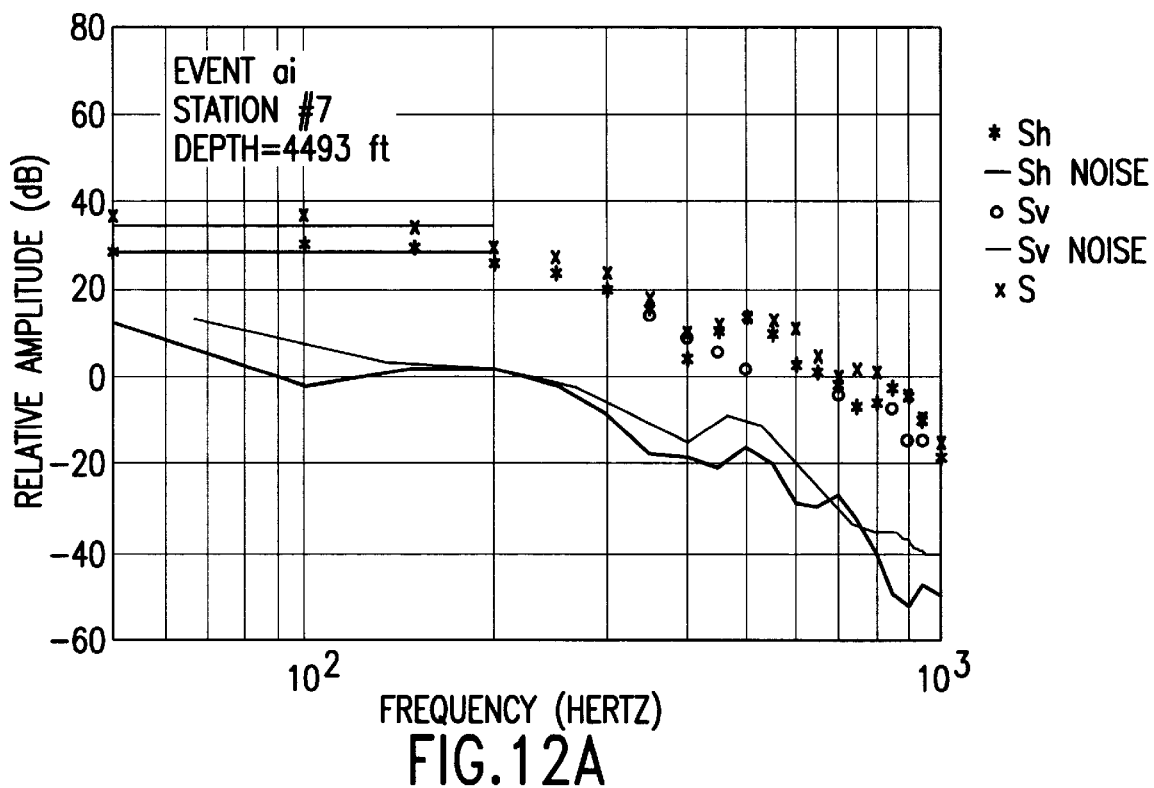
FIGS. 12A and 12B illustrate the application of a code to determine the S/P amplitude ratios.
Figure 12B:
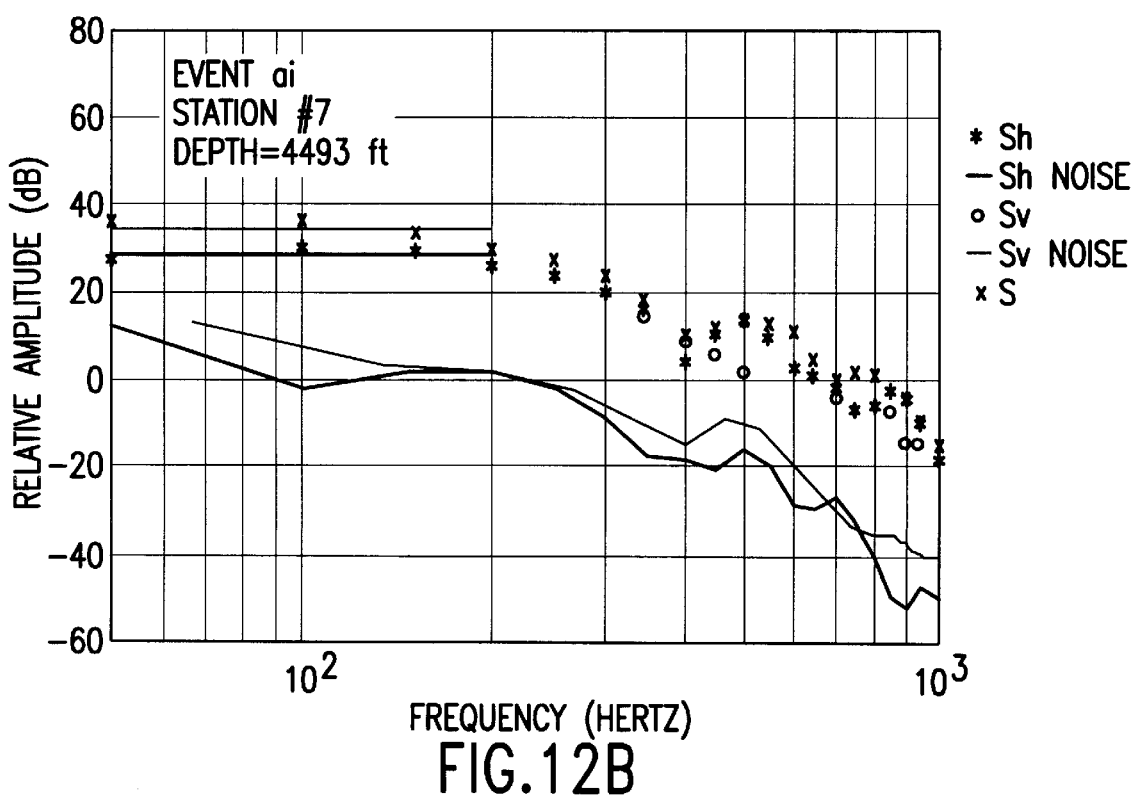
Figure 13A:
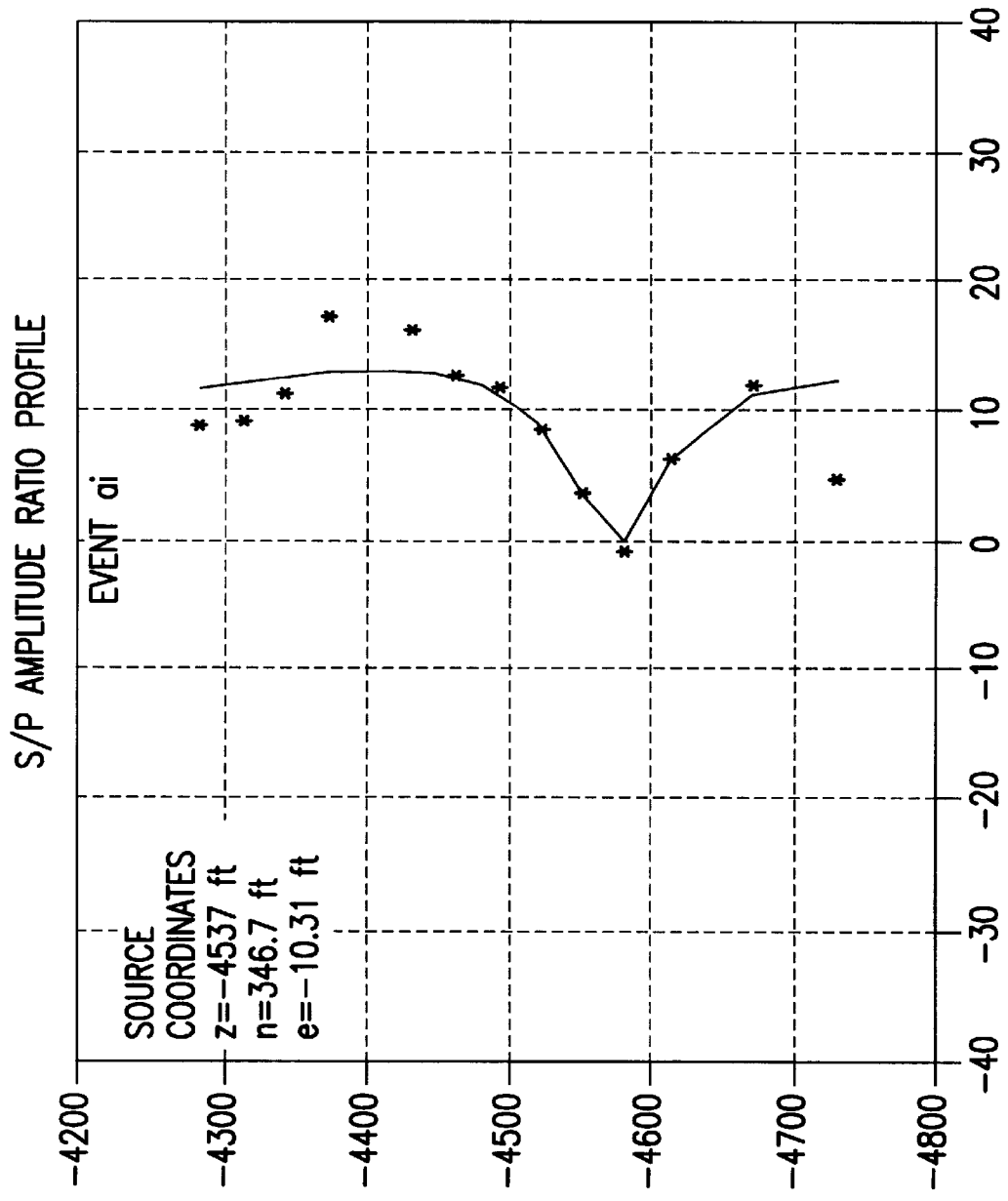
FIGS. 13A and 13B compare measured and predicted S/P amplitude ratio profiles for one event station pair in the first test.
Figure 13B:
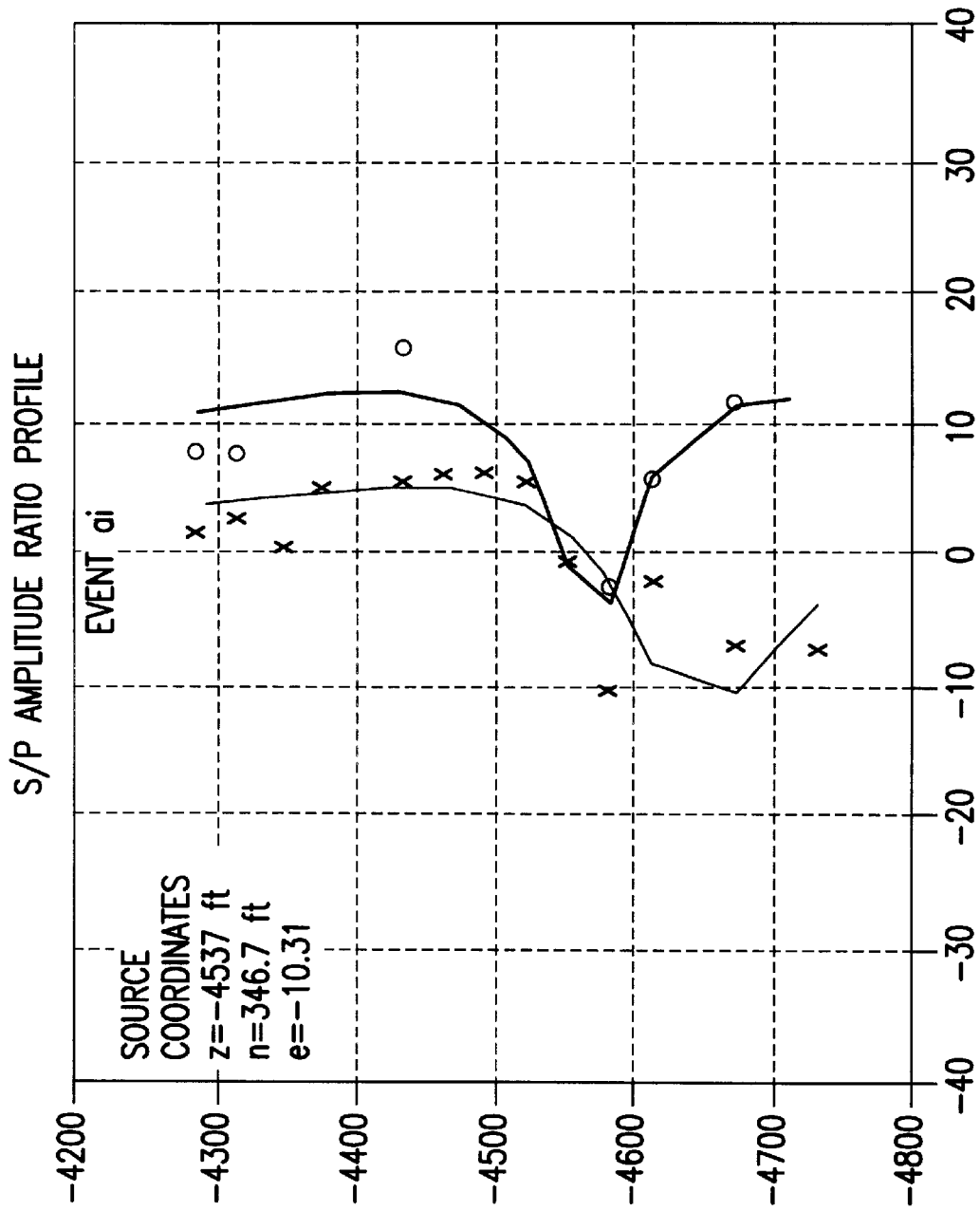

FIGS. 12A and 12B illustrate the application of the code described above to determine the S/P amplitude ratios for a specific microseismic event in the sample population. The asterisks seen in FIG. 12A define the estimated relative displacement amplitude spectrum of the P phase detected at station 7 for event ai in the sample subset. The solid curve seen in this figure describes the estimated background noise spectrum in the P-Sv plane. The length of the solid horizontal line defines the approximate width of the "far field, point source" frequency band for this particular event-station pair. Its level identifies the mean relative P spectral amplitude in this frequency band. Similar estimates for Sh (asterisks), Sv (o's) and S (x's) are shown in FIG. 12B. The curves shown as solid lines in this figure are the estimated Sh and Sv background noise spectra. The solid horizontal lines identify the mean relative Sh, Sv, and S spectral amplitudes. The amplitude ratios for the ai-7 event-station pair are determined from the measured values of the mean Sh, Sv, S, and P spectral amplitudes seen in FIGS. 12A and 12B.

The measured values of the S/P amplitude ratios for event ai (points) are compared to the "best fit" values (solid lines) in FIGS. 12A and 12B. The magnitude of the minimum length Residual Vector was found be 2.5 db for this event which represents a good fit between measured and predicted amplitude ratios. The orientation angles and Dilatancy Ratio for the pair of unit vectors which provided the "best fit" for the ai amplitude ratio data set are listed in Table 4. Notice that these vectors are identified only as $\hat{V}_1$ and $\hat{V}_2$. It will be recalled that $\hat{n}$ and $\hat{s}$ cannot be identified without ambiguity unless additional constraints are imposed upon the results of the inversion of the amplitude ratio data. Plausible constraints which should be applicable to the majority of microseismic events generated by fluid injection into oil and gas bearing formations are identified in the following paragraph.

TABLE 4

Orientation angles and the Dilatancy Ratio for the unit vectors associated with the minimum length Residual Vector for event ai.

| orientation angle | $\hat{V}_1$ | $\hat{V}_2$ | Dilatancy Ratio |
|---|---|---|---|
| θ | 22.9° | 41.7° | |
| φ | 157° | 182° | |
| | | | 0.5 |

In most regions where fluid injection is used to stimulate or enhance the recovery of oil and gas, it is generally safe to assume that one of the principal stress axes is vertically oriented. If it can be further assumed that the vertical stress is not the intermediate principal stress, and that the microfracturing induced by fluid injection is essentially a two dimensional process, it follows that $\hat{n}$ and $\hat{s}$ must lie in the same vertical plane. Let $\hat{f}$ denote the unit vector normal to the plane of $\hat{n}$ and $\hat{s}$. Then;

$$\hat{f}=\hat{n}\times\hat{s}=\sin\theta_f\cos\phi_f\hat{e}_E+\sin\theta_f\sin\phi_f\hat{e}_N+\cos\theta_f\hat{e}_Z \tag{34}$$

where, as before, $\theta a_f$ is measured clockwise with respect to the positive Z axis and $\phi_f$ is measured counterclockwise with respect to the positive E axis. Therefore, if the foregoing assumptions are valid $$\theta_f \approx 90° \tag{35}$$

and $$\phi_f \approx \phi_n \pm 90° \tag{36}$$

The applicability of these assumptions to the microseismic events acquired during the 7 B stimulation experiment was tested by calculating $\theta_f$ for the pairs of unit vectors ($\hat{V}_1, \hat{V}_2$) returned by the inversion code for the sample population.

Figure 14:
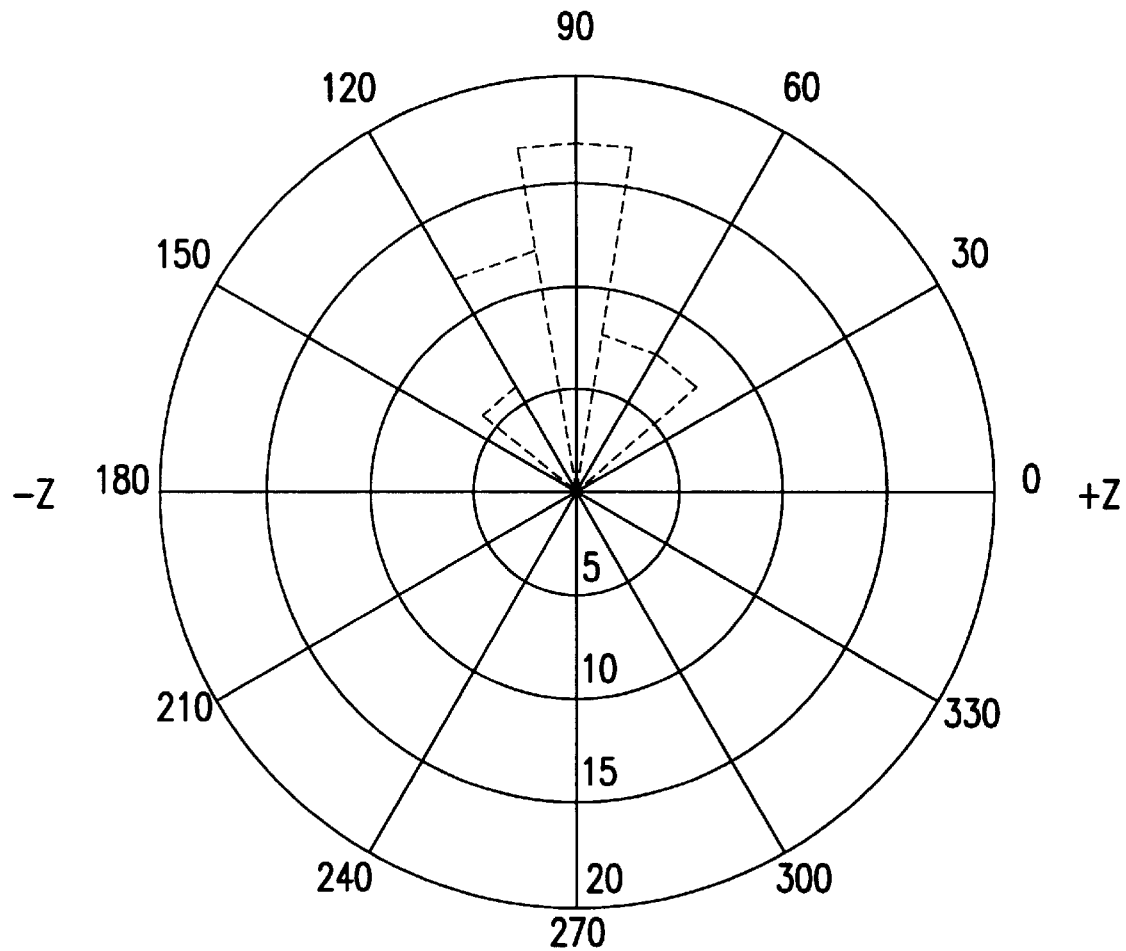
FIG. 14 is a Rose Diagram of the calculated dip angles of the normal to the planes formed by the calculated fracture normal vector and the calculated slip vectors for the first test data.
Figure 15:
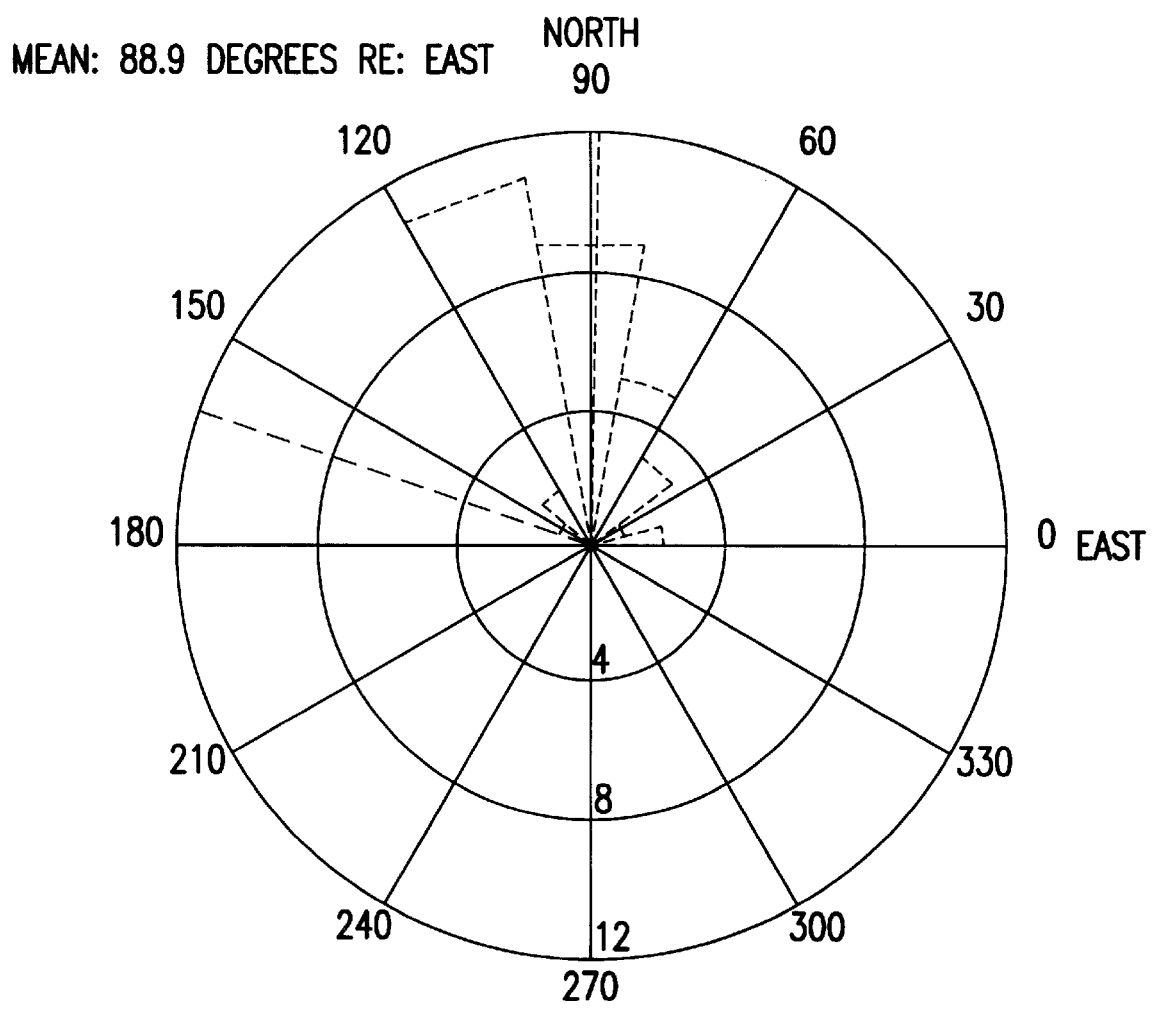
FIG. 15 is a Rose Diagram illustrating the calculated fracture azimuths for a subset of events in the test data set.

As shown in FIG. 14, the angular distribution of $\theta_f$ is characterized by a sample mean of 89.5° and a standard deviation of 26.7°. These results imply that while the assumption of verticality is applicable to the majority of events in the sample population, small scale heterogeneity in local stress state may cause the plane defined by $\hat{n}$ and $\hat{s}$ to be rotated as much as 45° for some events. It can also be seen from equation 36 that for those events whose $\hat{n}$–$\hat{s}$ planes are nearly vertically oriented, $\phi_f$ is approximately equal to the strike of the microfracture plane referenced to the positive E axis. The distribution of $\phi_f$ for those events whose values of $\theta_f$ satisfy the constraint that:

$$|\theta_f - 90°| \leq \text{standard deviation}(\theta_f) \tag{37}$$

is shown by the Rose Diagram seen in FIG. 15. The dashed line shown in this figure is the nominal azimuth of the hydraulic fracture created by the stimulation referenced to the positive E axis. The histogram of the distribution which is shown in red identifies a set of 34 microfractures whose strike angles are approximately given by:

$$\phi_f = 88.9° \pm 32.3° \tag{38}$$

referenced to the positive E axis or $$\phi_f = -71.1° \pm 32.2° \tag{39}$$

when referenced to the nominal direction of the hydraulic fracture created by the stimulation experiment.

Figure 16A:
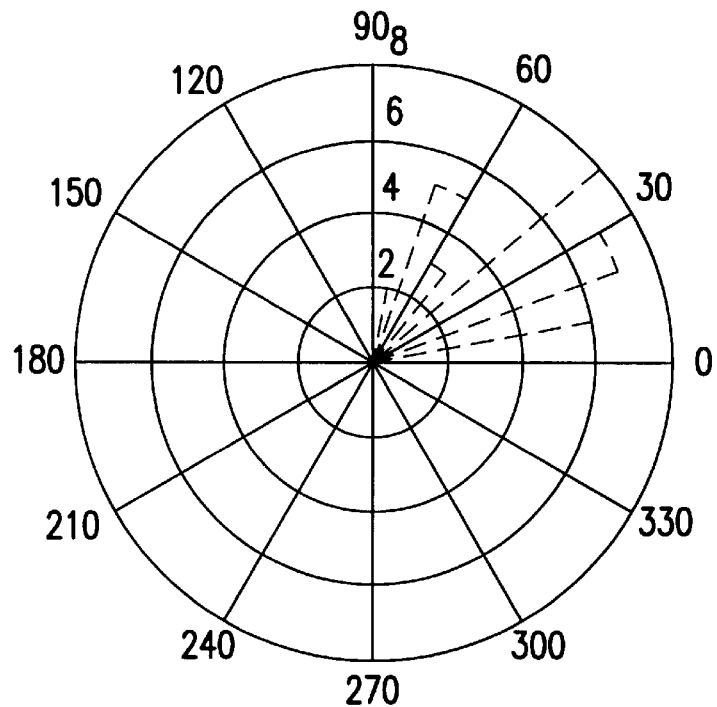
FIG. 16A is a Rose Diagram of the distribution of dip angles for a subset of events in the test data set.
Figure 16B:
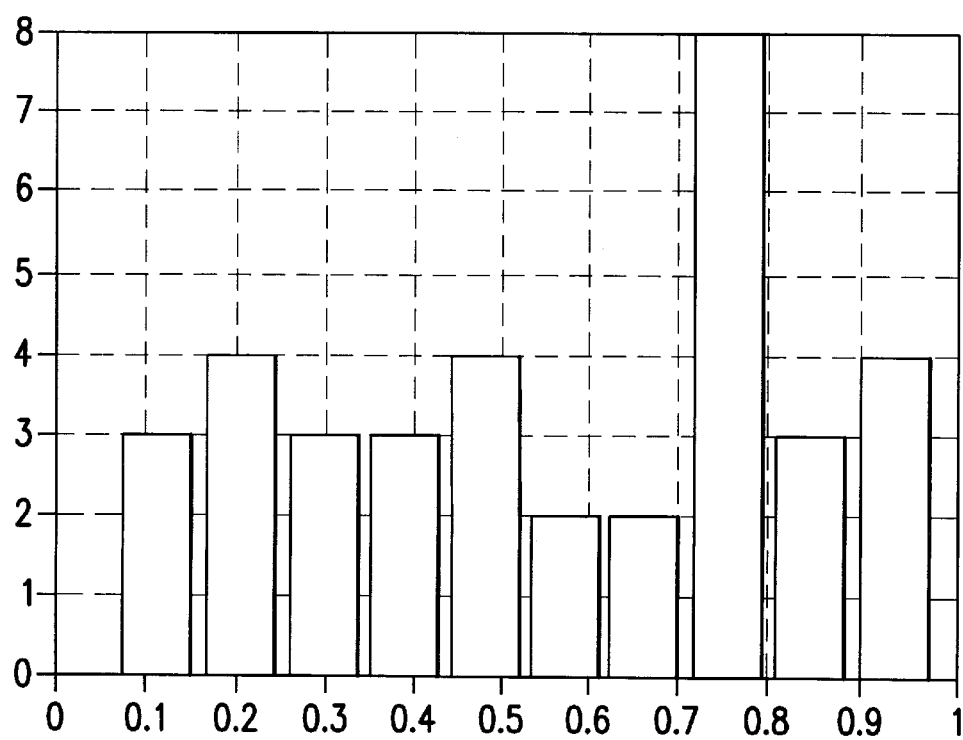
FIG. 16B illustrates the Dilatancy Ratio distribution for a subset of events in the test data set.

The distribution of the microfracture dip angles for the subset of microseismic events with near vertical n̂–ŝ planes is shown in the Rose Diagram seen in FIG. 16A. Notice that the distribution is bimodal with a primary peak near 30° and a secondary peak near 60°. These are dip angles which are often associated with shear fracturing. However, as shown by the histogram of the Dilatancy Ratio distribution seen in FIG. 16B, the majority of the events in this subset are not the result of pure shear failures. In fact, most are also characterized by statisitically significant dilatant components of relative movement.

The foregoing description has been presented for purposes of illustration and description. It is not intended to be exhaustive or to limit the invention to the precise forms disclosed. Obvious modifications or variations are possible in light of the above teachings. As an example, the microseismic data may be obtained by sensors located on the surface of the earth or in the injection well itself.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for determining the distribution and orientation of natural fractures in the earth comprising:
    an injection well penetrating a fluid reservoir and an observation well remotely disposed from the injection well;
    means for pressurizing fluid in the reservoir, wherein the pressure causes movements along surfaces of natural fractures in the earth;
    sensing means disposed in the observation well for sensing waves that emanate from the movements; and
    evaluating means responsive to the sensing means for evaluating the sensed waves to determine wave characteristics.

2. The system as defined in claim 1 wherein the sensing means includes a plurality of sensors disposed in a single observation well.

3. The system as defined in claim 1 wherein the sensing means includes a plurality of sensors that are disposed in a vertical array in a single observation well.

4. The system as defined in claim 1 wherein the evaluating means includes a data recorder.

5. The system as defined in claim 1 wherein the evaluating means includes a signal processor.

6. The system as defined in claim 1 wherein the evaluating means includes a data recorder and a signal processor.

7. The system as defined in claim 6 wherein the signal processor includes means for analyzing sensed wave data to estimate coordinates of the sensed wave source, the sensed wave source being a natural fracture in the earth.

8. The system as defined in claim 6 wherein the signal processor includes means for determining an amplitude of a shear wave component produced by the natural fracture, and for determining an amplitude of a compressional wave component produced by the natural fracture.

9. The system as defined in claim 6 wherein the signal processor includes means for predicting a theoretical shear wave versus compressional wave amplitude ratio for point sources of arbitrary failure mechanisms and orientations.

10. The system as defined in claim 6 wherein the signal processor includes means for matching a determined and a predicted shear wave versus compressional wave ratio to determine a failure mechanism and an orientation of the natural fracture.

11. The system as defined in claim 6 wherein the signal processor includes a computer readable storage medium containing program code having executable instructions for carrying out functional aspects of the signal processor.

12. The system as defined in claim 1 wherein the observation well is disposed within several thousand feet of the injection well.

13. A system for accurately determining the distribution and orientation of natural fractures in the earth by analyzing microseismic activity along said natural fractures induced by external stimuli, comprising:
    means for determining source coordinates of said microseismic activity;
    means for determining a ratio of the amplitude of a shear wave (S-wave) component produced by said microscismic activity to an amplitude of a compressional wave (P-wave) component produced by said microseismic activity (S/P ratio);
    means for predicting theoretical S/P ratios for point sources of an arbitrary failure mechanism and orientation by using said source coordinates; and
    means for matching said determined and said predicted S/P ratios to determine the failure mechanism and orientation of said natural fractures.

14. The system as defined in claim 13 wherein the means for determining source coordinates includes a plurality of sensors disposed in a single observation well.

15. The system as defined in claim 13 wherein the means for determining source coordinates includes a plurality of sensors that are disposed in a vertical array in a single observation well.

16. The system as defined in claim 13 wherein the means for determining includes a data recorder.

17. The system as defined in claim 13 wherein the means for determining includes a signal processor.

18. The system as defined in claim 13 wherein the means for determining includes a data recorder and a signal processor.

19. A system for accurately determining the distribution and orientation of natural fractures in the earth by analyzing microseismic activity along said natural fractures induced by external stimuli, comprising:
    a plurality of sensors to detect a wavefront generated by said microseismic activity and to transduce said wavefront to corresponding electrical signals; and a signal processor responsive to the electrical signals and configured to estimate coordinates of the source of said wavefront; to measure the amplitudes of a shear wave (S-wave) component and a compressional wave (P-wave) component comprising said wavefront; to determine the actual ratio of said S-wave component to said P-wave component (S/P ratio), to predict theoretical S/P ratios for point sources of arbitrary failure mechanisms and orientations corresponding to said source coordinates; to compare the actual S/P ratio to the predicted S/P ratios; and to determine the failure mechanism and the orientation of the natural fractures by matching the actual S/P ratio and the predicted S/P ratios.

20. A method for accurately determining the distribution and orientation of natural fractures in the earth by analyzing microseismic activity along said natural fractures induced by external stimuli, comprising the steps of:

detecting the elastic waves generated by said microseismic activity;

determining the source coordinates of said waves;

determining the amplitudes of the shear wave (S-wave) component and the compressional wave (P-wave) component of said waves;

determining the ratio of said S-wave amplitude to said P-wave amplitude (S/P ratio);

using said source coordinates to predict theoretical S/P ratios for point sources of arbitrary failure mechanism and orientation; and matching said determined S/P ratio and said predicted S/P ratios to determine the failure mechanism and orientation of said natural fractures.

* * * * *